United States Patent [19]

Frederick

[11] Patent Number: 5,448,760
[45] Date of Patent: Sep. 5, 1995

[54] CELLULAR TELEPHONE ANTI-FRAUD SYSTEM

[75] Inventor: Max B. Frederick, Arnold, Calif.

[73] Assignee: Corsair Communications, Inc., Sunnyvale, Calif.

[21] Appl. No.: 74,083

[22] Filed: Jun. 8, 1993

[51] Int. Cl.$^6$ .................................................. H04B 7/00
[52] U.S. Cl. .................................. 455/56.1; 455/54.2; 455/33.1; 455/67.1; 380/23; 379/62
[58] Field of Search .................... 455/54.1, 54.2, 58.1, 455/56.1, 33.1, 38.1, 67.1, 227, 228, 115; 379/62; 380/23

[56] References Cited

U.S. PATENT DOCUMENTS

| | | |
|---|---|---|
| 3,649,909 | 3/1972 | Ort et al. |
| 4,114,136 | 9/1978 | D'Albora |
| 4,146,892 | 3/1979 | Overman et al. |
| 4,249,257 | 2/1981 | Campbell |
| 4,414,632 | 11/1983 | Murrell |
| 4,426,648 | 1/1984 | Tsui et al. |
| 4,455,678 | 6/1984 | McKiel, Jr. |
| 4,559,602 | 12/1985 | Bates, Jr. |
| 4,597,107 | 6/1986 | Ready et al. |
| 4,700,191 | 10/1987 | Manor |
| 4,797,931 | 1/1989 | Furukawa et al. |
| 4,811,377 | 3/1989 | Krolopp et al. |
| 4,827,259 | 5/1989 | Murphy et al. |
| 4,843,562 | 6/1989 | Kenyon et al. |
| 5,005,210 | 4/1991 | Ferrell |
| 5,046,082 | 9/1991 | Zicker et al. |
| 5,204,902 | 4/1993 | Reeds, III et al. ........... 380/23 |
| 5,237,612 | 8/1993 | Raith ........... 380/23 |
| 5,239,680 | 8/1993 | Grube et al. ........... 455/38.1 |
| 5,329,591 | 7/1994 | Magrill ........... 380/23 |

FOREIGN PATENT DOCUMENTS 0163358 12/1985 European Pat. Off. ............. 379/62

OTHER PUBLICATIONS

D. Margerum, "Pinpointing Location Of Hostile Radars", Microwaves, Nov. 1969 pp. 14–18.

Primary Examiner—Edward F. Urban
Assistant Examiner—Doris To
Attorney, Agent, or Firm—Harness, Dickey & Pierce

[57] ABSTRACT

Authorized use of a wireless subscriber system, e.g. cellular telephone system, is distinguished from unauthorized use by electronically observing a plurality of external signal traits which represent alterations in the radio frequency signal due to physical characteristics identified with a particular transmitter. Examples of such external signal traits include those which are produced as a consequence of manipulating the carrier to encode information upon it and those produced by transmitter timing circuit idiosyncrasies. The external signal traits are converted into a signature code or security pattern which is then stored along with the existing subscriber system identification code to generate a historic security pattern database for use in subsequent authorized use validation.

44 Claims, 10 Drawing Sheets

CELLULAR TELEPHONE ANTI-FRAUD SYSTEM

BACKGROUND OF THE INVENTION

1. Technical Field

This invention relates to wireless subscriber systems and, more particularly, the use of devices for granting or denying access to the wireless subscriber system.

2. Discussion

Some wireless subscriber systems utilize identification codes which are transmitted by wireless subscriber units along with other data sent to a receiver/transmitter site, base station, or cell. Electronics associated with the receiver/transmitter site can identify the wireless subscriber unit by the identification code. The identification codes can be used for billing the wireless subscriber unit for "air time" on a subscriber system or telephone exchange in addition to a basic monthly rate.

Such identification codes can be intercepted during an authorized user's transmission to the subscriber service or telephone exchange. The identification codes can then be programmed into an unauthorized wireless subscriber unit allowing the fraudulent user to gain access to the telephone exchange. The use of the subscriber service or telephone exchange by the unauthorized user is usually incorrectly billed to the authorized user and, of course, the operators of the subscriber system or telephone exchange are typically unable to collect the basic monthly rate from the unauthorized user.

Other wireless subscriber units do not automatically transmit an identification code during transmission. Identification of these wireless subscriber units is desirable when they are interfering with the transmission of other users, when they are being operated in a clandestine manner, or when they are otherwise being misused.

In an effort to address the above problems, radio fingerprinting was developed in the 1940's and 1950's. Oscilloscope photos or hand drawings of amplitude or frequency-detected turn-on transients, turn-off transients, and a final resting frequency of received radio transmitter signals were prepared. The photos or drawings reflect the damping factor and natural period of the radio transmitter and were visually compared to previous measurements to identify the radio transmitter. However radio fingerprinting became more difficult beginning in the 1960's due to an increasing number of radio transmitters and to manufacturing consistency of modern day radio transmitters. Thus, the turn-on transients, turn-off transients, and final resting frequency of the radio transmitters became far less distinguishable from each other using the radio fingerprinting method.

In U.S. Pat. No. 5,005,210 to Ferrell, a turn-on transient of a frequency demodulated waveform from a transmitter is captured and analyzed. Transmitters are identified by measuring signal phase of the turn-on transient or phase response of the turn-on transient with respect to a predetermined frequency. Commercial devices in accordance with Ferrell have captured the turn-on transient in a microcomputer for visual comparison by a user to subsequent captured turn-on transient. Point-by-point comparison of the digitized turn-on transient by the microcomputer has proven to be very difficult and unreliable because the turn-on transients are not exactly the same for successive turn-ons of the same transmitter. Consequently, visual comparison has been used. The system in Ferrell is simply a computerized version of the radio fingerprinting of the late 40's and 50's and does not meet the needs of modern subscriber systems adequately. Visual comparison is not practical in large subscriber systems due to customer expectations of fast access and due to excessive cost of visual comparison. Additionally, other portions of a transmitter's signal contains information having much greater transmitter discrimination/identification value.

Cellular telephone systems encounter similar problems as those described above. Cellular telephones have an identification code including an electronic serial number (ESN) and a mobile identification number (MIN) assigned to each phone. When the cellular telephone user initiates a call, the telephone transmits the identification code assigned to the phone for billing and call authorization purposes.

Tampering with the phone to alter the MIN or ESN was supposed to result in an inoperable phone. However, fraudulent persons devised ways to obtain the identification code of an authorized cellular telephone and to input the numbers into an unauthorized cellular telephone. The unauthorized cellular telephone could be used for "free" while charges for the calls were billed to the authorized user. The unauthorized users also did not pay the basic monthly rates. Unfortunately, no other provision for user identification was typically built into the cellular telephone system.

Alternate methods proposed were unacceptable irritations to the users or were vulnerable to being defeated by fraudulent persons. For example, one proposed method includes a request for a user personal identification number (PIN) each time a call is made. The PIN could be transmitted on a different frequency. However, some users will be irritated by the PIN request and change to a different carrier who does not require PIN's.

PIN systems also presuppose that the authorized user desires to maintain the PIN number in secrecy. Even if PIN systems are made universal, they are still vulnerable to interception by fraudulent persons.

Other proposed methods include operator interaction with each caller for positive personal identification and per call requests for credit card numbers. However, these methods are economically unfeasible and are still subject to the same problems as the PIN method. Any system which requires identification data to be transmitted from the cellular telephone to the cell sites can be intercepted, copied, and used to gain unauthorized access.

In summary, any proposed solution must allow easy access while still providing protection to the operator of the subscriber service or telephone exchange.

SUMMARY OF THE INVENTION

In a first form of the invention, a transmitter identification device includes a plurality of transmitters each for generating a transmitter signal with internal data traits and external signal traits. A receiver located remote from the transmitters receives the transmitter signal. A characterizing device connected to the receiver characterizes one of the transmitters and generates a plurality of characterizing signals for the one transmitter. The characterizing device generates the plurality of characterizing signals by measuring features of the external signal traits of said one of said transmitters from at least one of a first category including variations of specified parameters of said one of said transmitter, and a second category including variations in non-specified parameters. A converter connected to the characterizing device converts the plurality of characterizing signals into a security pattern. The security pattern is used to identify said one of said transmitters.

In another feature of the invention, a historic security pattern storing device stores historic security patterns for a plurality of transmitters. A first comparator connected to the converter and the historic security pattern storing device compares the security pattern of said one of said transmitters to said plurality of historic security patterns stored in said historic security pattern storing device.

It is still another feature of the invention that the first comparator generates a confidence level indicating a likelihood that one of said transmitters also generated the historic security pattern.

In still another feature of the invention, the confidence level generated by the first comparator indicates a mismatch condition, a possible mismatch condition, and a match condition.

In another embodiment, apparatus for identifying wireless subscriber units and for granting or denying access to a subscriber service includes a plurality of wireless subscriber units each for generating a wireless subscriber signal including internal data traits and external signal traits and for receiving a receiver/transmitter signal. The internal data traits include an identification code. A receiver/transmitter is located remote from the wireless subscriber units. The receiver/transmitter receives the wireless subscriber signal and transmits the transmitter/receiver signal. A characterizing device is connected to the receiver/transmitter and generates a plurality of characterizing signals for one of said wireless subscriber units. The characterizing device generates said plurality of characterizing signals by measuring features of said external signal traits from at least one of a first category inducing variations of specified parameters of said one of said wireless subscriber units, a second category including variations in nonspecific parameters, and a third category including variations in reactions or responses to interrogations. A converter connected to the characterizing device converts the characterizing signals to a security pattern. The security pattern and the identification code are used to identify said one of said wireless subscriber units.

The apparatus for identifying wireless subscriber units can further include a device for storing historic security patterns for said one of said wireless subscriber units and a first comparing device connected to the converter and the storing device for comparing the security pattern to the historic security pattern corresponding to the identification code of said one of said wireless subscriber units.

The first comparing device generates a confidence level indicating a likelihood that said one of said wireless subscriber units also generated the historic security pattern.

Another feature of the invention is an access device for granting or denying access to one of said wireless subscriber units to said subscriber system based upon said confidence level.

In another feature of the invention, the confidence level generated by the first comparing device indicates a mismatch condition, a possible mismatch condition, and a match condition.

In still another feature of the invention, a device stores a fraudulent user history for a plurality of fraudulent wireless subscriber units. A second comparing device connected to the first comparing device compares the security pattern of said one of said wireless subscriber units to the fraudulent user history when the first comparing means generates the confidence level indicating the possible mismatch condition. The second comparing device generates a match signal or a mismatch signal.

In yet another feature of the invention, the access device grants access to said one of said wireless subscriber units if the first comparing device generates the confidence level indicating the match condition, or if the first comparing device generates the confidence level indicating the possible mismatch condition and the second comparing device generates the mismatch signal.

In a further feature of the invention, the access device denies access to one of said wireless subscriber units if said first comparing device generates the confidence level indicating the mismatch condition, or if the first comparing device generates the confidence level indicating the possible mismatch condition and the second comparing device generates the match signal. The fraudulent user history storing device is updated with the security pattern of one of said wireless subscriber units when the access device denies access.

BRIEF DESCRIPTION OF THE DRAWINGS

The various advantages of the present invention will become apparent to those skilled in the art after studying the following specification and by reference to the drawings in which:

FIG. 10A, 10B and 10C are waveform diagrams of a typical wireless subscriber signal including a pre-carrier portion, a pre-amble portion, a text portion, and a post-carrier portion;

DESCRIPTION OF THE PREFERRED EMBODIMENT

Figure 1:
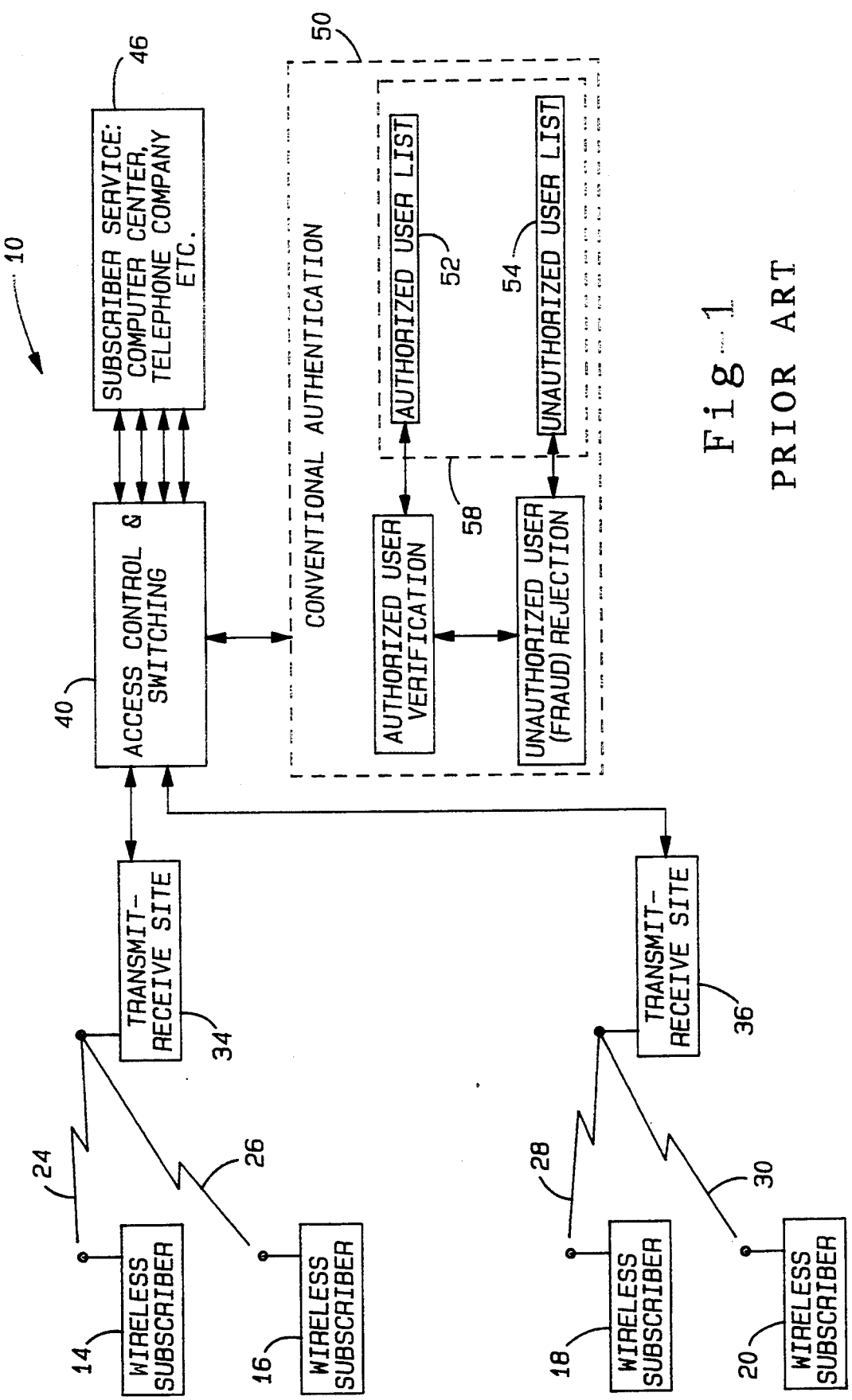
FIG. 1 is a functional block diagram of a wireless subscriber system according to the prior art.

In FIG. 1, a wireless subscriber system 10 of the prior art is shown. The wireless subscriber system 10 includes multiple wireless subscriber units 14, 16, 18, 20, which can be cellular telephones or other transmitters. Each wireless subscriber unit 14, 16, 18, 20 transmits a wireless subscriber signal and receives a transmitter/receiver signal (both are identified in FIGS. 1 and 2 with reference numbers 24, 26, 28, 30, respectively) to one of a plurality of transmit/receive sites 34 and 36 which generate the transmitter/receiver signal and which can be cell stations for the cellular telephones.

The plurality of transmit/receive sites 34 and 36 are typically spaced throughout a service area. The wireless subscriber signals 24 and 26 from the wireless subscriber units 14 and 16 are transmitted to and received by the transmit/receive site 34 due to proximity thereto. After initial turn-on transients die out, the wireless subscriber signals and the transmitter/receiver signals each include internal data traits and external signal traits. The internal data traits of the wireless subscriber signal can include digitized or analog voice data, video data, subscriber system protocol data, etc. Other types of data will be readily apparent. Similarly, the wireless subscriber signal 28 and 30 from the wireless subscriber units 18 and 20 are transmitted to and received by transmit/receive site 36 due to proximity thereto.

As the wireless subscriber units 14, 16, 18, 20 move about in the service area, an access control and switching device 40 "hands off" the wireless subscriber signals 24, 26, 28 and 30 from one transmit/receive site to another. For example, as the wireless subscriber unit 14 travels away from transmit/receive site 34 towards transmit receive site 36, the access control and switching device 40 transfers transmitting and receiving functions from the transmit/receive site 34 to the transmit/receive site 36.

The internal data traits of the wireless subscriber signals 24, 26, 28 and 30 from the wireless subscriber units 14, 16, 18, 20 can include an identification code which can include a mobile identification number (MIN), an electronic serial number (ESN), a manufacturer's code (MAN), and a station class mark (SCM). "Identification code" as used herein means information in the wireless subscriber signal sent by a wireless subscriber unit to identify itself. Prior to granting access to a subscriber service or telephone company 46, an authorized user verification device 50 connected to the access control and switching device 40 verifies the identification code to determine if the wireless subscriber unit, for example wireless subscriber unit 14, is an authorized user by comparison with an authorized user list 52.

If the wireless subscriber unit 14 is on the authorized user list 52, the access control and switching device 40 grants access to the subscriber service or telephone company 46. If the wireless subscriber unit is not on the authorized list, the wireless subscriber unit is placed on an unauthorized user list 54. Both the authorized and unauthorized user list 52 and 54 can be stored in memory 58 associated with the authorized user verification device 50.

The access control and switching device 40 can be located at the same location as the subscriber service or telephone company 46 or remote therefrom.

Figure 2:
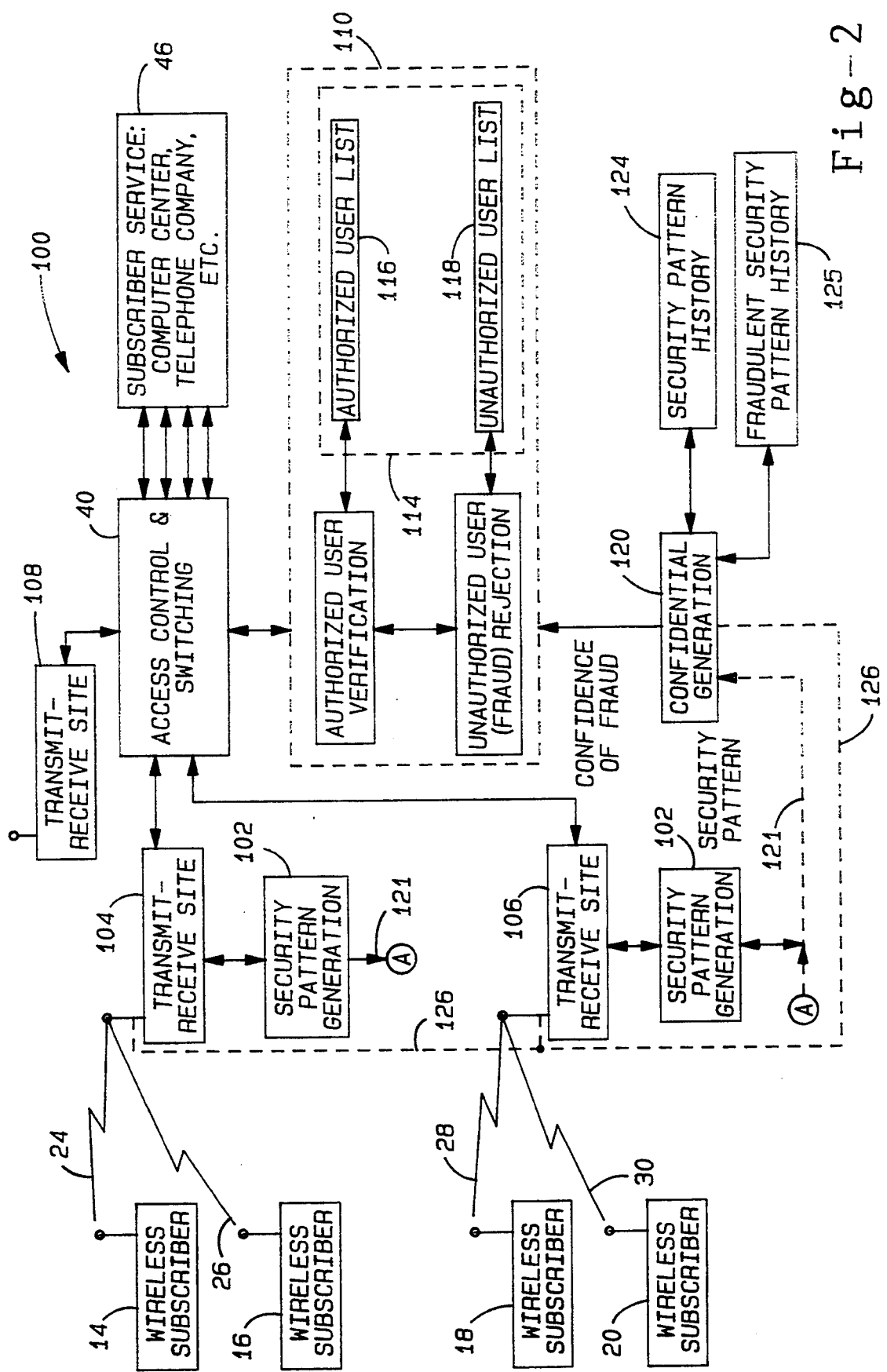
FIG. 2 is a functional block diagram of a wireless subscriber system incorporating the present invention.

In FIG. 2, a subscriber system 100 according to the present invention is shown. A security pattern generation device 102 is connected to modified transmit/receive sites 104 and 106. Note that an unmodified transmit/receive site 108 without the security pattern generation device 102 may also be connected to the access control and switching device 40. The security pattern generating device 102 measures a plurality of unique features of the external signal traits of the wireless subscriber unit which is currently transmitting and receiving the wireless subscriber signal to and from the transmit/receive site attached to the security pattern generating device 102. The unique features measured by the security pattern generating device 102 identify the wireless subscriber unit from other authorized or unauthorized wireless subscriber units. Such identification of the wireless subscriber unit is hereinafter called "characterizing" (also characterization) and is described further below.

The security pattern generating device 102 converts the characterization into a signature code or security pattern which is typically a multi-digit number. The security pattern is combined with the identification code (or parts thereof, for example the MIN or ESN) of the wireless subscriber unit into a combined security code. The combined security code is output to the access control and switching device 40 and then to a modified authorized user verification device 110 which can have a memory 114 associated therewith for storing an authorized user list 116 and an unauthorized user list 118. The modified authorized user verification device 110 can be designed to accept either the identification codes from the unmodified transmit/receive site 108 or the combined security code from the modified transmit/receive sites 104 and 106.

Since the subscriber system is already set up for transmitting the identification code (for example, both the ESN and the MIN which can be ten digit numbers) from each transmit/receive site to the access control and switching device 40 and then to the authorized user verification device 50 (or modified authorized user verification device 110), it is desirable to combine the characterization with the identification code to minimize system changes.

When the modified authorized user verification device 110 receives identification codes from the unmodified transmit/receive sites 108, the modified authorized user verification device 110 looks only for the identification code and performs an identification procedure similar to that described above in conjunction with FIG. 1. When the modified authorized user verification device 110 receives the combined security code from the modified transmit/receive sites 104, 106, the modified authorized user verification device 110 transmits either the combined security code or the identification code and the security pattern to a confidence level generation device 120 which can be located locally or remote from the modified authorized user verification device 110. The security pattern and identification code can also be combined into the combined security code for the purpose of sending minimum data through the access control and switching device 40 and the modified authorized user verification device 110.

Alternatively, a separate data link 121 can be provided between the security pattern generating device 102 and the confidence level generating device 120. If the separate data link 121 is provided, the identification code (or parts thereof) need not be combined with the security pattern. The separate data link 121 can transmit the identification code (or parts thereof) and the security pattern to the confidence level generation device 120 separately.

The confidence level generation device 120 is connected to a security pattern history storage device 124 and a fraudulent user history storage device 125 both of which can be located locally or remote from both the modified user verification device 110 and/or the confidence level generation device 120. The confidence level generation device 120 compares the security pattern in the combined security code of the wireless subscriber units 14, 16, 18, 20 to previously recorded security patterns (for each wireless subscriber unit) stored under the identification code, the ESN or the MIN in a security pattern history storage device 124. Depending on the correlation between the recently transmitted security pattern and the historic security patterns, the confidence level generation device 120 generates a confidence level indicating a probability that the wireless subscriber unit generating the security pattern is or is not the same as the wireless subscriber unit which generated the security patterns stored in the security pattern history storage device 124. The modified authorized user verification device 110 determines whether the requesting wireless subscriber unit generating the security pattern is or is not an authorized user based upon the confidence level signal and can grant or deny access to a subscriber service or telephone exchange 46. Alternatively, the confidence level generation device 120 can include access means for granting or denying access to the subscriber service or telephone exchange 46 based upon the confidence level signal.

Access can be denied in many different ways. For example, when either the confidence level generation device 120 or the modified authorized user verification device 110 determines that access should be denied, for example because the wireless subscriber unit is fraudulently using a MIN/ESN of another wireless subscriber unit, the confidence level generation device 120 or the modified authorized user verification device 110 can output (internally or via external connection 126) commands to the transmit/receive site. Typically when a request for service is made (e.g. the fraudulent wireless subscriber requests connection to a second wireless subscriber unit), the transmit/receive site transmits the ESN/MIN used by the requesting wireless subscriber unit on a forward control channel along with a command to change to a specified voice channel assigned to the wireless subscriber unit. The requesting wireless subscriber unit typically dwells in a mode watching the forward control channel for the command to change to the specified voice channel. The transmit/receive site and the confidence level generation device or the modified authorized user verification device automatically follows the wireless subscriber unit to the specified voice channel. A simulated or actual wireless subscriber unit associated with the confidence level generation device and the modified authorized user verification device can issue a service termination command to the transmit/receive site and service is discontinued to the fraudulent wireless subscriber unit. The simulated or actual wireless subscriber unit simulates a command by the fraudulent wireless subscriber unit to hang-up before the transmit/receive site connects the fraudulent wireless subscriber unit to the second wireless subscriber unit.

Alternate methods of denying access will be readily apparent. For example, if a first wireless subscriber unit having a first MIN/ESN is currently using the subscriber service and moments later the wireless subscriber unit having the first MIN/ESN requests service (e.g. call collision), some modified transmit/receive sites are designed to disconnect service to the first wireless subscriber unit. The confidence level generation device 120 or the modified authorized user verification device 110 can deny access to a wireless subscriber unit simply by requesting service at the modified transmit/receive site using the ESN/MIN of the wireless subscriber unit to be denied service.

Figure 3A:
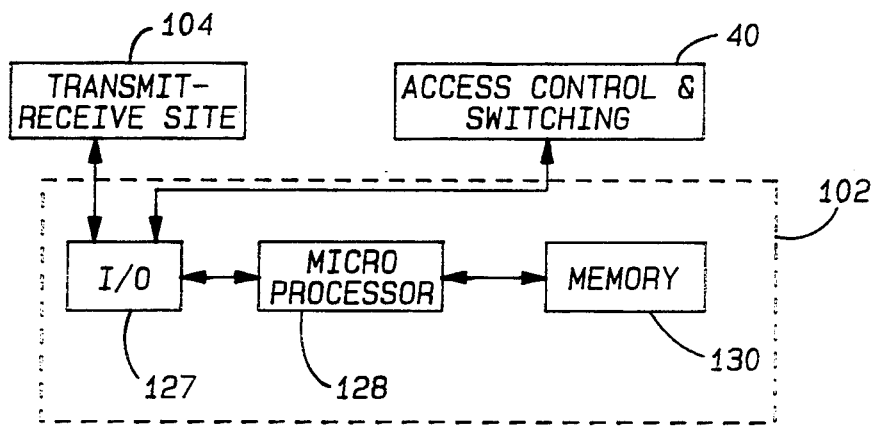
FIG. 3A is a functional block diagram of a security pattern generation device.

In FIG. 3A, a block diagram depicts the security pattern generation device 102 which includes an I/O device 127, a microprocessor 128, and memory 130. Alternatively, the security pattern generation device 102 can be a program stored and executed by the transmit/receive site 104. The confidence level generating device 120 can similarly have an I/O device, a microprocessor, and memory.

Figure 3B:
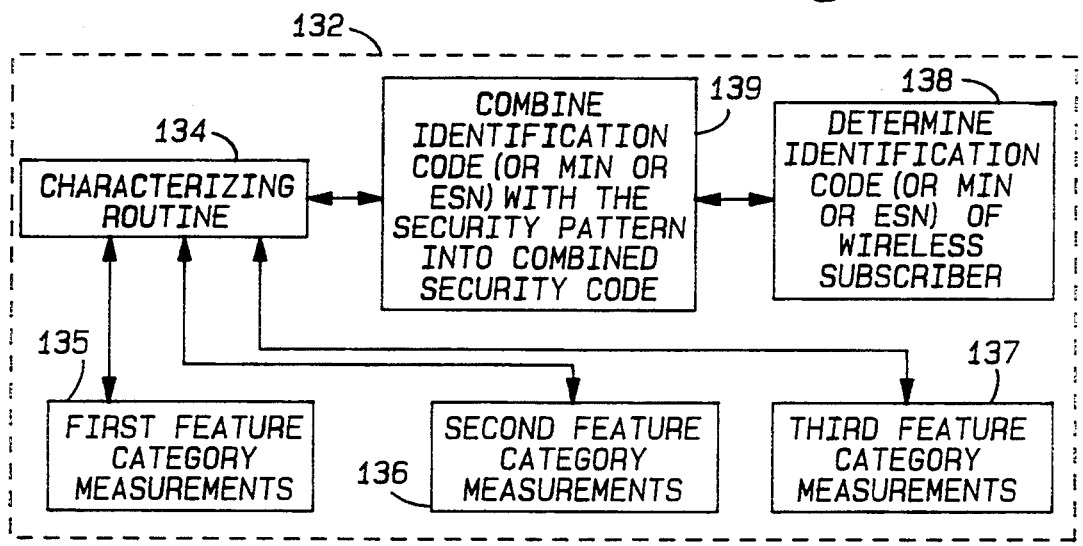
FIG. 3B is a functional block diagram of a security pattern algorithm located in memory associated with the security pattern generation device.

In FIG. 3B a security pattern generation algorithm 132 in the memory 130 is shown. In blocks 134–137, a characterizing routine controls measurements on the wireless subscriber signal from first, second and third feature categories described in detail below and generates a security pattern, for example a multi-digit number wherein each digit or group of digits represents a measured feature. Each digit or group of digits could also represent deviation of the measured feature from typical values as described below.

In block 138, the security pattern generation algorithm 132 determines the identification code of the wireless subscriber unit. In block 139, the security pattern generation algorithm 132 combines the security pattern generated by the characterization routine with the identification code generated by the block 138 into the combined security code. The combined security code is then output by the security pattern generation device 102 and/or the transmit/receive site 104 to the access control and switching device 40 as described above.

Alternatively, the security pattern and the identification code (or portions thereof; for example, the MIN and/or the ESN) are sent separately via the separate data link 121 to the confidence level generation device 120. If the separate data link 121 is used, block 139 may be omitted.

CHARACTERIZATION AND SECURITY PATTERN GENERATION

Characterization of a wireless subscriber unit by the characterizing algorithm 132 in the security pattern generation device 102 can be accomplished by measuring features of the external signal traits of the wireless subscriber signal from preferably three feature categories. The first feature category includes natural variations of specified parameters of the wireless subscriber unit within or outside specification tolerances. The specified parameters of the external signal traits of the wireless subscriber signal can be expected to range up to twice the specified tolerance. For example, one specified parameter measured could be bit rate, which typically has a tolerance of ±1 Hz of a nominal value. A second specified parameter could be the transmitting or receiving RF, which typically has a tolerance of ±2 kHz from channel center. A third specified parameter could be RF shift which typically has a tolerance of ±200 Hz of 16 kHz. Other specified parameters will be readily apparent.

The second feature category includes variations in non-specified parameters. For example, the non-specified parameter could be slope of mark or space frequencies. Other non-specified parameters will be readily apparent.

The third feature category includes variations in reactions or responses to interrogations by the security pattern generation device 102. For example, the security pattern generation device 102 can request the wireless subscriber unit to make an RF power change. The security pattern generation device 102 can then measure the delay in the wireless subscriber unit's response and/or the change in amplitude of the wireless subscriber unit in relation to the change requested. Other types of interrogations, commands and responses will be readily apparent.

Figure 4:
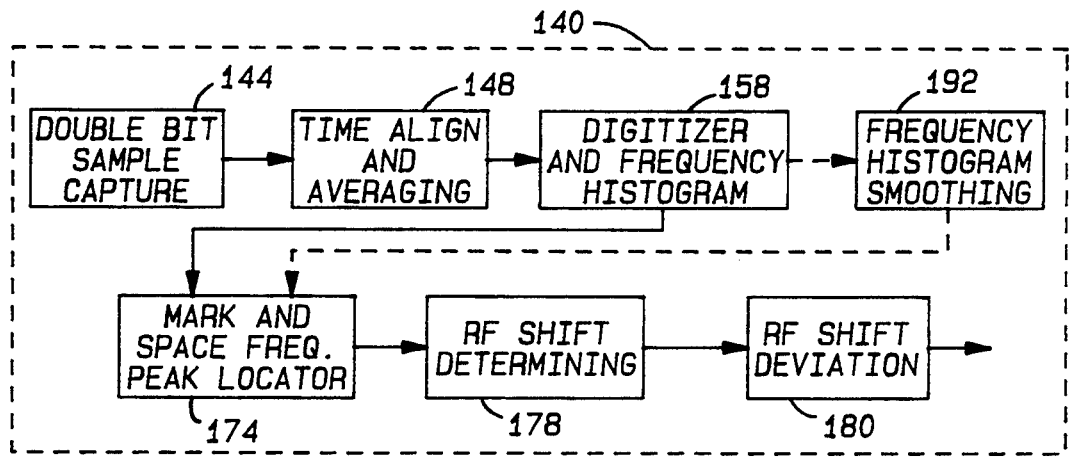
FIG. 4 is a functional block diagram of a RF shift characterizing routine located in the memory of the security pattern generation device.

In FIG. 4, a functional block diagram of a RF shift characterizing routine 140 (the first feature category) forming part of the security pattern generating device 102 is shown. A double bit sample capture block 144 captures double bit words (e.g. two 0's (space) followed by two 1's (mark)) from the wireless subscriber signal received by the transmit/receive site 104. Alternatively, the wireless subscriber signal received by the transmit/receive site 104 can be recorded in memory and thereafter retrieved by the double bit sample capture block 144. A time align and averaging block 148 generates a first waveform output 152 (with a channel center at 153) shown in FIG. 5A which includes multiple time aligned and averaged double bit words from the wireless subscriber signal 24.

Figure 5A:
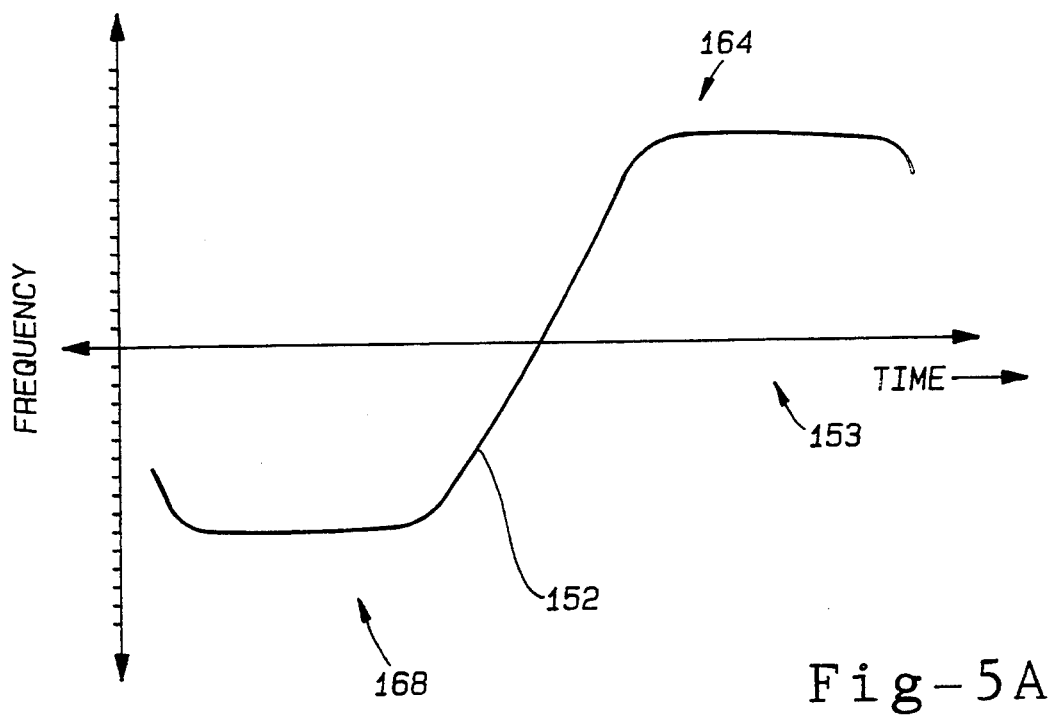
FIG. 5A is a first waveform output of a first wireless subscriber unit generated by a time align and averaging block in FIG. 4.
Figure 5B:
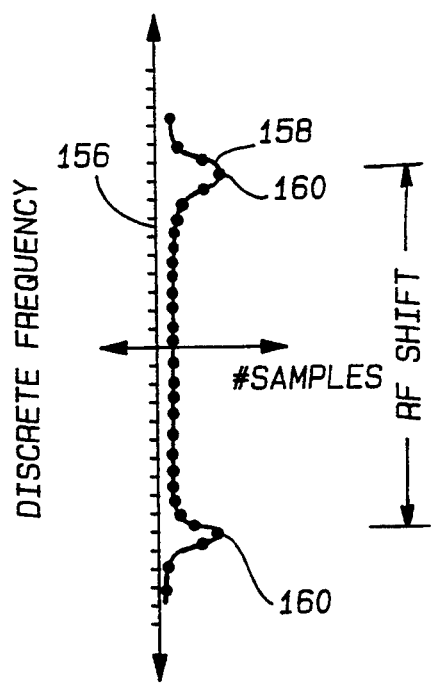
FIG. 5B is a first frequency histogram of the first waveform output of FIG. 5A generated by a frequency histogram block of FIG. 4.

A frequency histogram block 154 generates a frequency histogram graphically depicted in FIG. 5B. The frequency histogram block 154 includes a predetermined number of discrete frequency divisions 156 and samples the first waveform output 152 from the time align and averaging circuit 148 at a sample frequency T. The frequency histogram block 154 generates a frequency histogram 158 in FIG. 5B which depicts the number of samples at each discrete frequency (captured at each sample frequency T). Peaks 160 in the frequency histogram 158 identify a mark frequency 164 and a space frequency 168.

A mark and space frequency peak locator block 174 determines the frequency of the peaks 160 in the frequency histogram 158 to determine the mark and space frequencies 164, 168. An RF shift determining block 178 subtracts the mark and space frequencies 164, 168 to generate a measured RF shift of the wireless subscriber unit.

A RF shift deviation block 180 compares the measured RF shift with a standard or mean RF shift and generates a number representing deviation. When measuring RF shift of the wireless subscriber unit, expected values of RF shift are typically ±200 Hz of 16 kHz but can range on a scale between 12 kHz and 20 kHz. A RF shift scale for RF shift values is determined. The scale from 12 kHz to 20 Khz can be divided into equal divisions.

For example, the scale 12 Khz to 20 kHz can be divided into 99 equal divisions. Measured RF shift values less than 12 kHz could be assigned the deviation number 01, values greater than 20 kHz could be assigned the deviation number 99, and values around 16 kHz could be assigned the deviation number 50. Values between 12 kHz and 16 kHz and 16 kHZ and 20 kHz can be assigned the deviation numbers between 02–49 and 51–98 respectively. If desired (e.g. to provide better differentiation of the RF shift values) the scale from 12 kHz to 20 kHz can be divided into unequal divisions or skewed. Scales from 1–9, 1-F (hexadecimal), 1–999, etc. can also be used. Other methods of assigning numbers to the range of RF shift values are readily apparent.

Figure 6A:
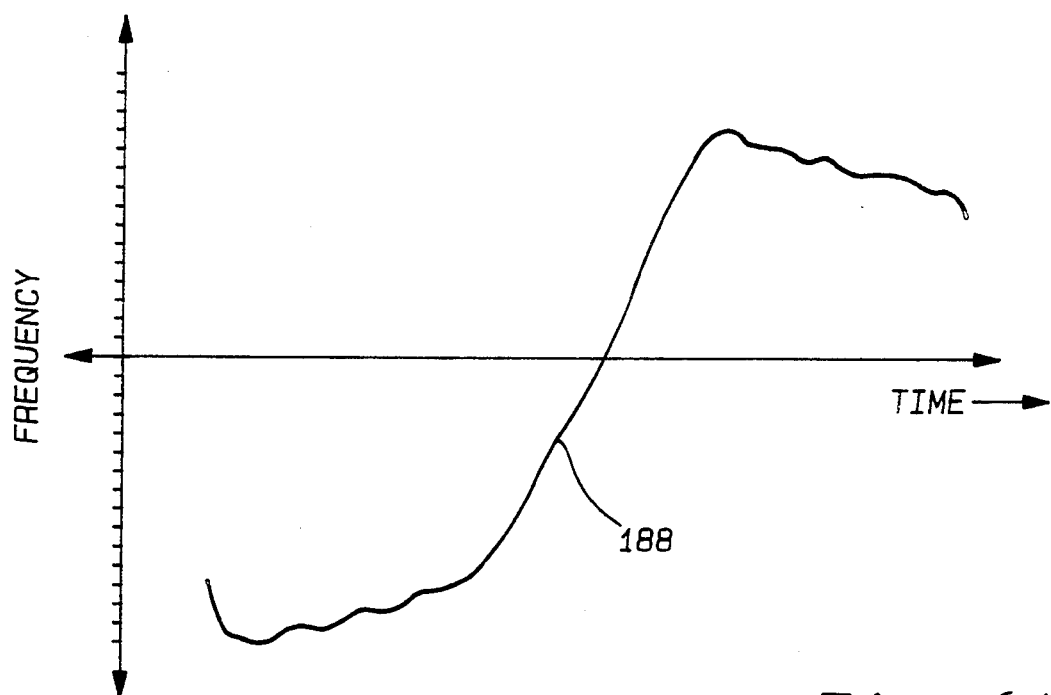
FIG. 6A is a second waveform output of a second wireless subscriber unit generated by the time align and averaging block of FIG. 4.
Figure 6B:
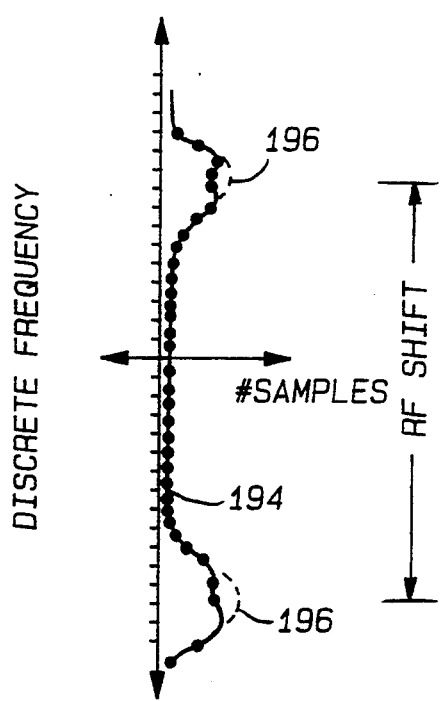
FIG. 6B is a second frequency histogram of the second waveform output of FIG. 6A generated by the frequency histogram block of FIG. 4.

In FIG. 6A, a second waveform output 188 generated by sampling another wireless subscriber unit does not define mark and space frequencies as distinctly as the first waveform output 152 in FIG. 5A. A frequency histogram smoothing block 192 can be used to further define the mark and space frequencies by generating a modified frequency histogram 194 (see FIG. 6B) incorporating dotted line 196.

Figure 7:
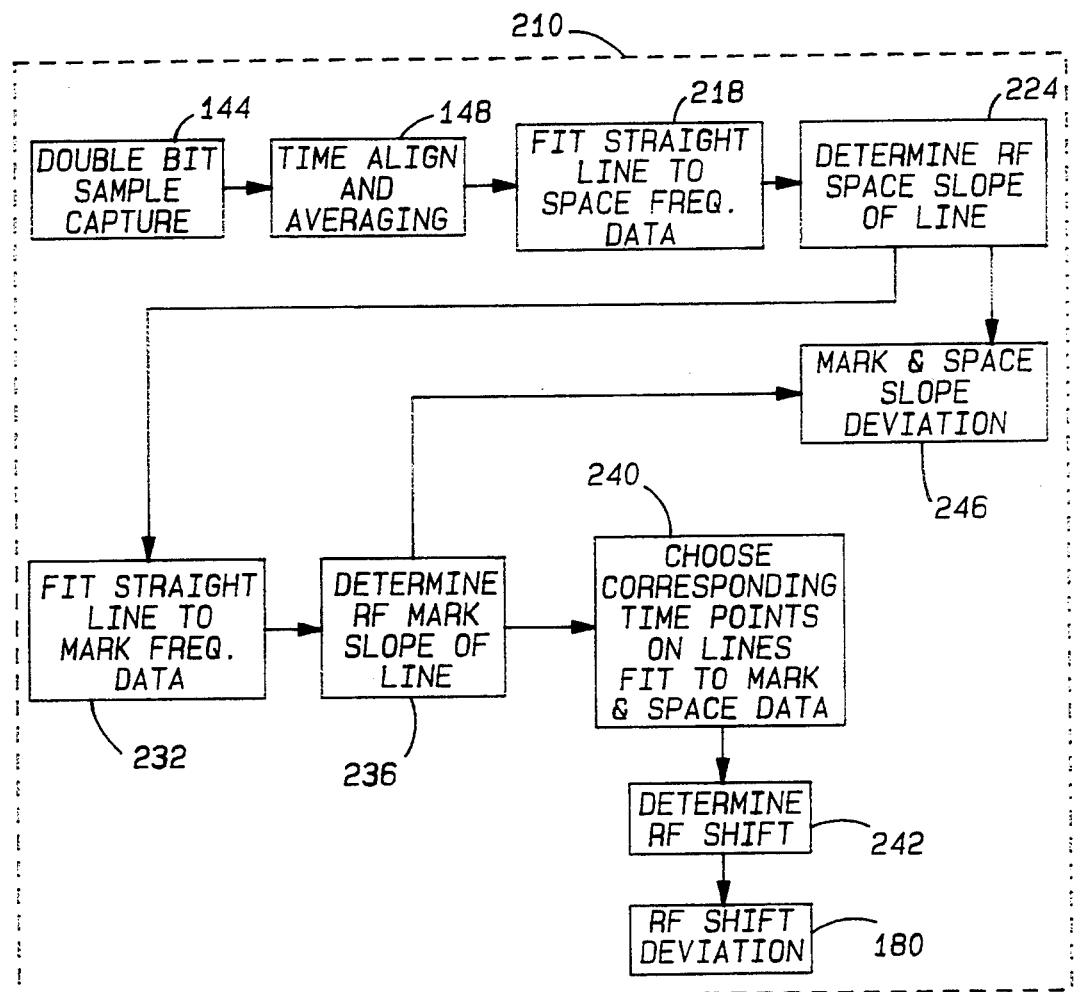
FIG. 7 is a functional block diagram of an alternate RF characterizing routine located in the memory of the security pattern generation device.
Figure 8A:
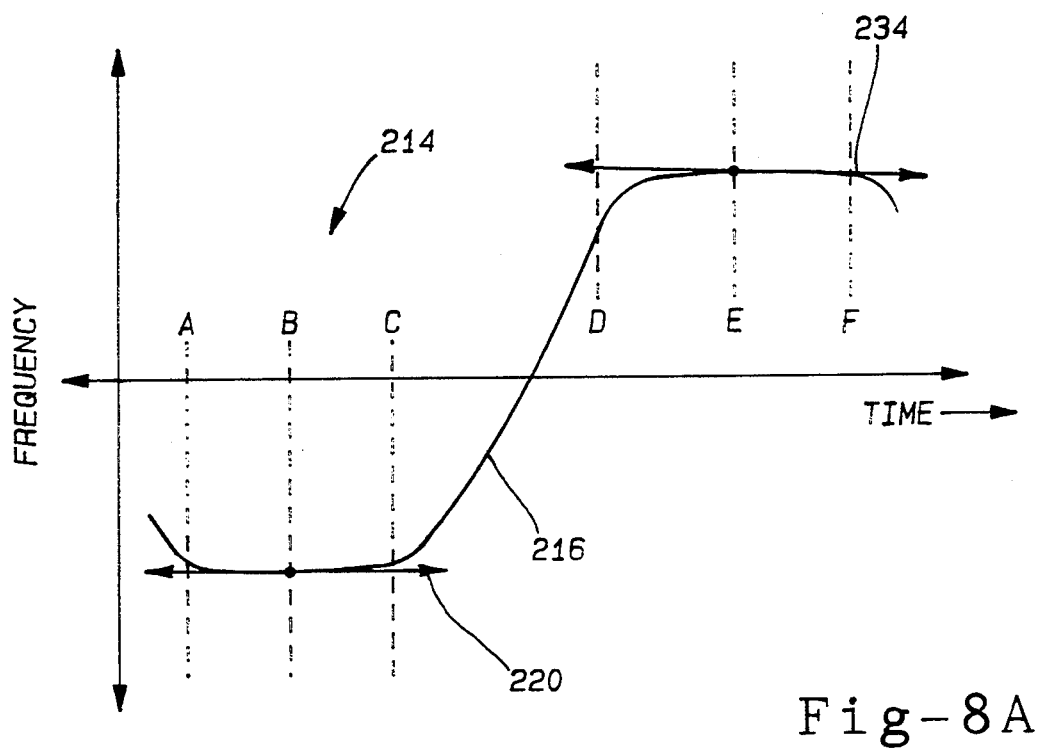
FIG. 8A is the first waveform output with straight line segments being fit thereto by a least-means-squared method according to the RF characterizing routine of FIG. 7.
Figure 8B:
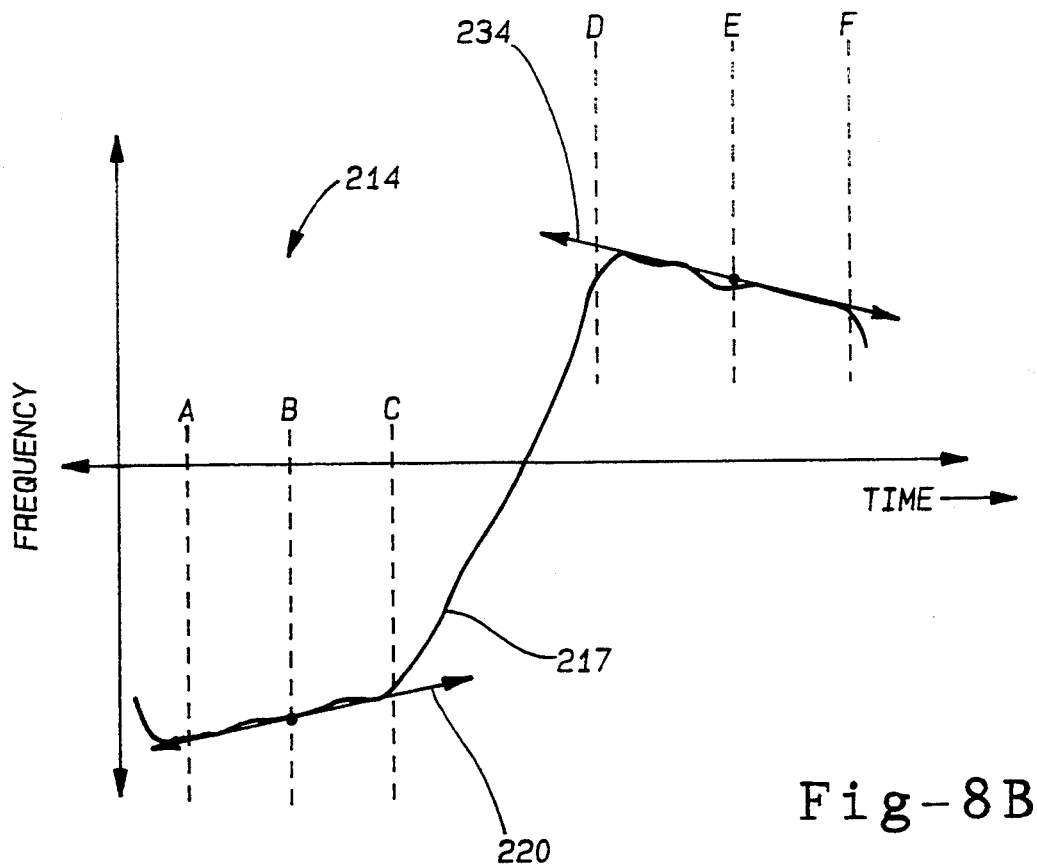
FIG. 8B is the second waveform output with straight line segments being fit thereto by the least-means-squared method according to the RF characterizing routine of FIG. 7.

In FIGS. 7, 8A and 8B an alternate method of characterizing RF shift (the first feature category) and a method of characterizing RF mark and space slope (the second feature category)is shown. In FIG. 7, a functional block diagram of alternate RF characterizing routine 210 forming part of the security pattern generation device 102 is shown. The alternate RF characterizing routine 210 utilizes the double bit sample capture block 144 and the time align and averaging block 148 of FIG. 4.

A space frequency portion 214 of waveform 216 in FIG. 8A and a waveform 217 in FIG. 8B is divided into times A, B and C. In block 218 (FIG. 7), a straight line 220 is rotated about a point at time B and fit to the space frequency portion 214 between time A and time C by a least-means-squared method. In block 224, RF space slope is determined (RF space slope approximately 0 in FIG. 8A; RF space slope>0 in FIG. 8B).

A mark frequency portion 230 of the waveform 216 in FIG. 8A and the waveform 217 in FIG. 8B is divided into times D, E, and F. In block 232 (FIG. 7), a straight line 234 is rotated about a point at the time E and fit to the mark frequency portion 230 between the time D and the time F by the least-means-squared method. In block 236, RF mark slope is determined (RF mark slope approximately 0 in FIG. 8A; RF mark slope<0 in FIG. 8B). In blocks 240 and 242, corresponding time points on lines 220 and 234 are chosen on the waveforms 216 and 217 to determine RF shift. For example, time points B and E on the waveform 216 can be chosen and the frequencies at the time points B and E subtracted to determine the RF shift. Alternatively time points A and D or C and F can be chosen to maximize information and discrimination of the wireless subscriber units. In block 180, the RF shift deviation is determined as described above.

Note that the RF mark and space slopes were determined by the alternate RF characterizing routine 210 at blocks 224 and 236. In block 246, mark and space slope deviation are determined in a manner analogous to the RF shift deviation determination described above.

Figure 9:
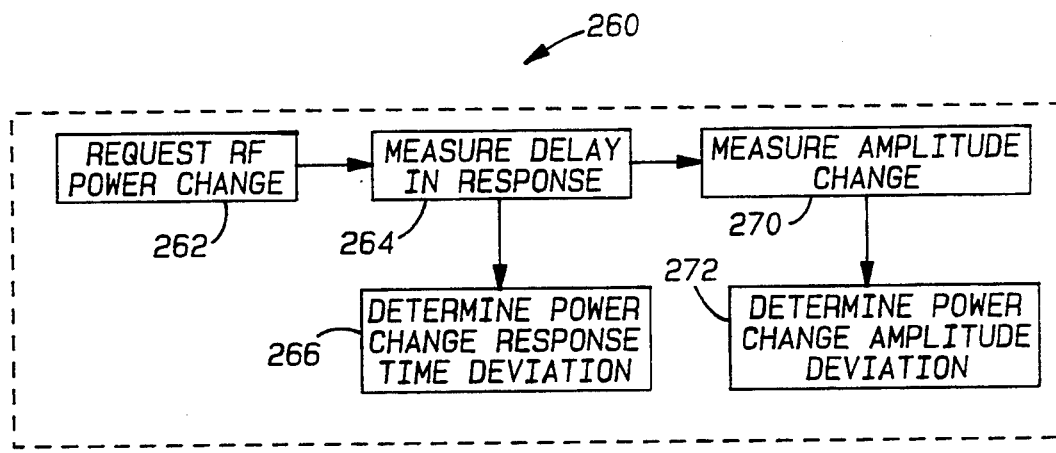
FIG. 9 is a functional block diagram of a request for power change characterizing routine located in the memory of the security pattern generation device.

In FIG. 9, a request for power change characterizing routine 260 (the third feature category) forming part of the security pattern generation device 102 is shown. In block 262, a request for RF power change is transmitted by the transmit/receive site 104 to the wireless subscriber unit. In blocks 264 and 266, delay in the wireless subscriber unit's response is measured and power change response time deviation is determined in a manner analogous to the RF shift deviation described above. In blocks 270 and 272, RF amplitude change of the wireless subscriber signal is measured and power change amplitude deviation is determined in a manner analogous to the RF shift deviation described above.

Additional methods of converting measured features of the external signal traits from the three categories to numerical values will be readily apparent. For example, in FIGS. 4-8 inclusive, single length bits (one "0" or space followed by one "1" or mark) could be used to determine RF shift of the wireless subscriber unit. Alternatively, a frequency histogram could be generated by sampling all bits during a given period (however waveform following may be required). Additionally, RF shift could be inferred from measured intersymbol interference. Intersymbol interference can be determined by measuring time offset between time combs (see description below) fit to all single bit length to double bit length transitions versus all double bit length to single bit length transitions (however, band bias corrections may be required).

The characterizing routine 134 (FIG. 3B) generates the security pattern by combining the following: the RF shift variation from the RF characterizing routine 140 or from the alternate RF characterizing routine 210 (for example RF shift deviation=78); the RF mark and space slope deviations from the alternate RF characterizing routine 210 (for example mark slope deviation=3, space slope deviation=5), and the RF power change response time and amplitude deviation from the power change characterizing routine 260 (for example power change time deviation=61, power change amplitude deviation=7). The characterizing routine combines the deviations into the security pattern 7835617 with the first two digits representing the RF shift deviation, the third and fourth digits representing the mark and space slope deviations, and the fifth, sixth and seventh digits representing the power change time and amplitude deviations.

The block 138 in the security pattern generation algorithm 132 in FIG. 3B determines the identification code, the MIN or the ESN of the wireless subscriber unit, for example a ten digit code 0001212345. The block 139 in the security pattern generation algorithm 132 combines the ten digit number (corresponding to the identification code, the MIN or the ESN) with the security pattern into the combined security code. For example, the security pattern could be added to the most significant digits of the identification code (or MIN or ESN) (without carry) to generate the ten digit combined security code 7836829345.

Figure 10A:
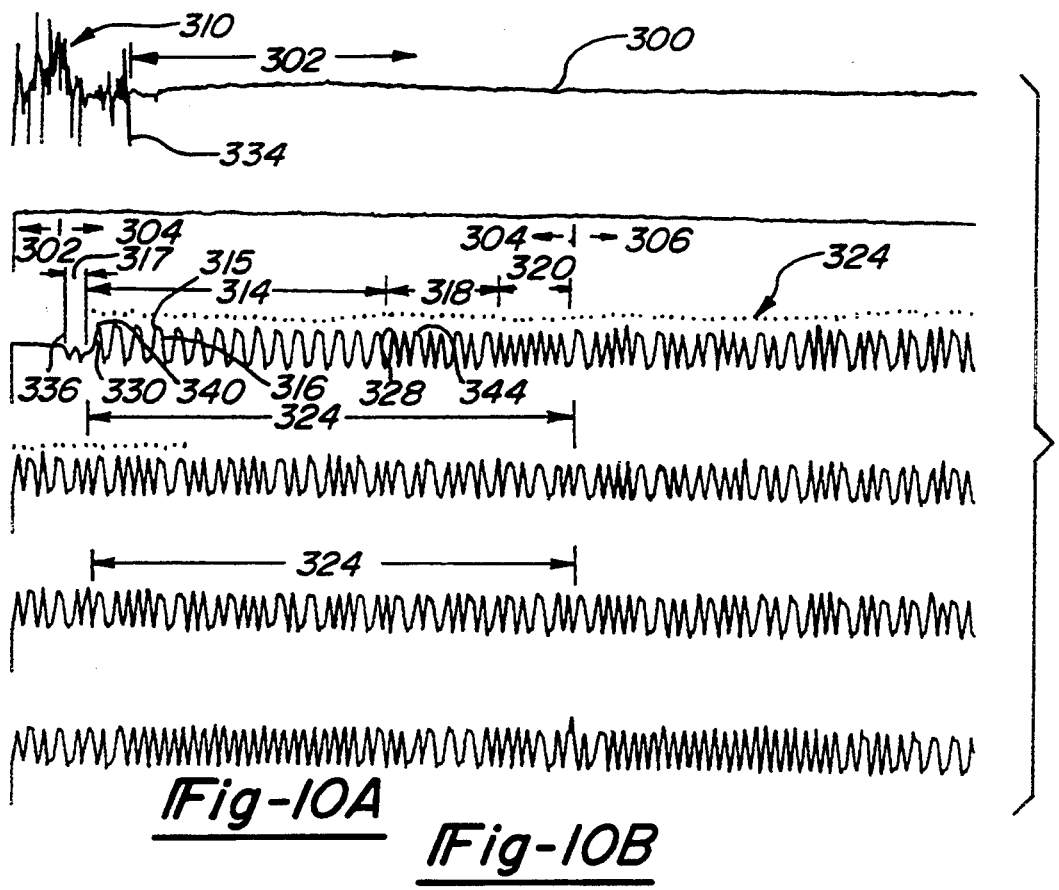
Figure 10B:
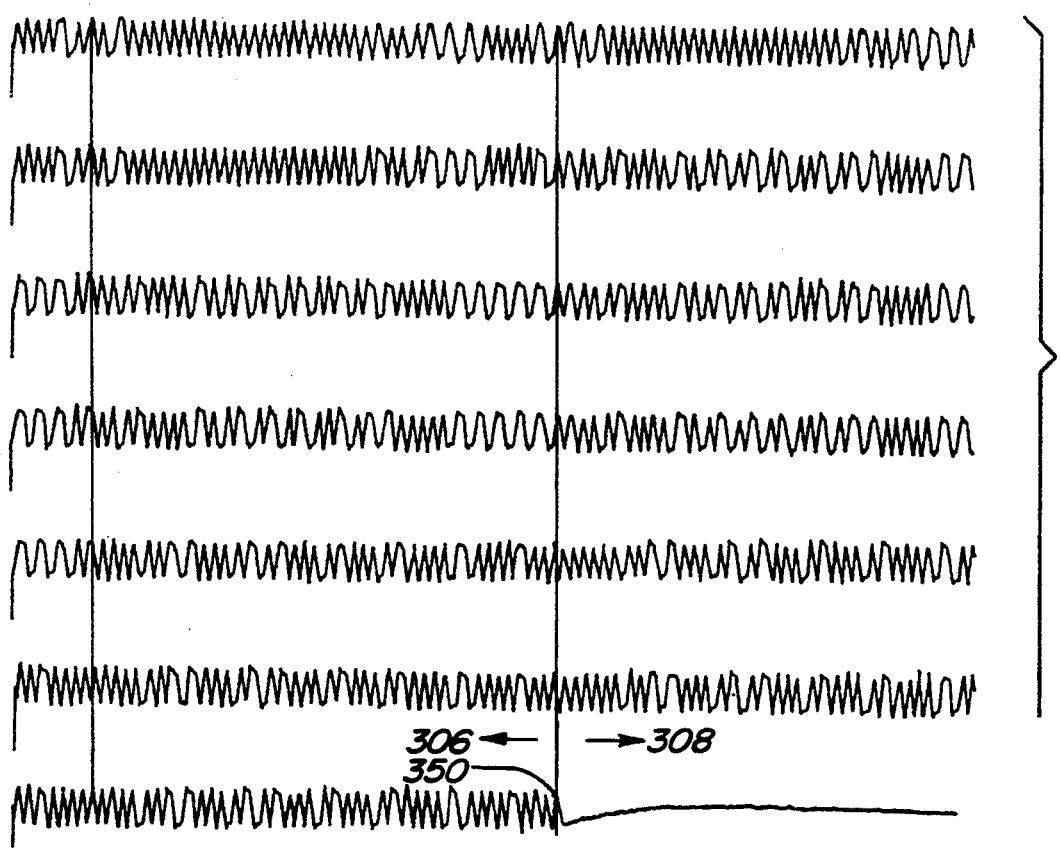

Other additional features in the three categories may also be measured (and deviations computed for the features) for incorporation into a security pattern. In FIGS. 10A-C, some of these additional features of the external traits are identified on a typical wireless subscriber signal 300 including a pre-carrier portion 302, a preamble portion 304, a text portion 306 and a post-carrier portion 308. Turn-on transient 310 preceding the pre-carrier portion 302 and turn-off transient 312 (FIG. 10C) following the post-carrier portion 308 are not used as a characterizing features due to limited wireless subscriber unit discrimination information and other considerations described above.

A dotting portion 314 with alternating marks 315 and spaces 316 follows a partially formed mark or space portion 317. A sync word 318 and a DCC word 320 follow the dotting portion 314. A first word 324 is repeated several times and follows the DCC word 320. The following are examples of other characterizing features which can be used:

1. PFS (Point of First Sync)—PFS 328 is an adjusted time of a first space to mark transition in the sync word 318. PFS is adjusted based on time of tooth in TC1 (described below) nearest measured PFS.
2. PFD (Point of First Dot)—PFD 330 is defined as 3.000000 msec before the PFS 328.
3. PTN (Point of Turn-On)—PTN 334 is time of RF rise relative to the PFS 328. PTN 334 is a point of energy rise which occurs during the turn-on transient. PTN 334 is an amplitude/time detected characterizing feature.
4. PFW (Point of First Warning)—PFW 336 is a point of first warning that bits are about to start.
5. FMD (First Mark Dotting)—FMD 340 is the time of the first fully formed mark in the dotting word 308.
6. TMS (Third Mark Sync)—TMS 344 corresponds to a third mark in the sync word 318. Typically located between 0.2 msec after the PFS 328 and 0.3 msec after the PFS 328.
7. FBD (First Bit of Data)—FBD 346 occurs at a time of transition of a first bit of data in the first word 324. The transition typically occurs 1.8000 msec after the PFS 328.
8. LBZ (Last Bit of Data in word Z)—LBX (not shown) is a time of transition of a last bit of data in word Z. Typically occurs at (PFS 328 plus 1.8000 msec plus (Z times 4.8 msec).
9. LBD (Last Bit of Data)—LBD 350 is time of transition of a last bit of data in a last word of the text portion 306. Typically occurs at (PFS 328 plus 1.8000 msec plus (NAWC times 4.8 msec). NAWC is the number of additional words coming. NAWC is protocol typically located in several bits of the first word 324.
10. PTF (Point of Turn-Off)—PTF 352 corresponds to a time of energy drop to off condition.
11. PECL (Pre-Carrier Length)—PECL equals (PFS 328 minus 3.000000 msec minus PTN 334).
12. POCL (Post-Carrier Length)—POCL equals (PFS 328 minus LBD 350).
13. TC1 (Time Comb 1)—TC1 is a time comb fit (see description below) by a least-means-squared method of space to mark transitions without intersymbol interference (e.g. double length bit lengths on both sides (two spaces or 0's followed by two marks or 1's)).
14. TC2 (Time Comb 2)—TC2 is the time comb fit (see description below) by the least-means-squared method of mark to space transitions without intersymbol interference (e.g. double length bit lengths on both sides (two marks or 1's followed by two spaces or 0's)).
15. TTC1 (Time of Time Comb 1)—TTC2 is a time of a tooth in TC1 nearest the PFS 328.
16. TTC2 (Time of Time Comb 2)—TTC2 is a time of a tooth in TC2 nearest the PFS 328.

Security patterns can be generated, for example, by comparing the timing of any of the above events with a standard and by generating a number representing deviation. Other characterizing features will be readily apparent.

Figure 11:
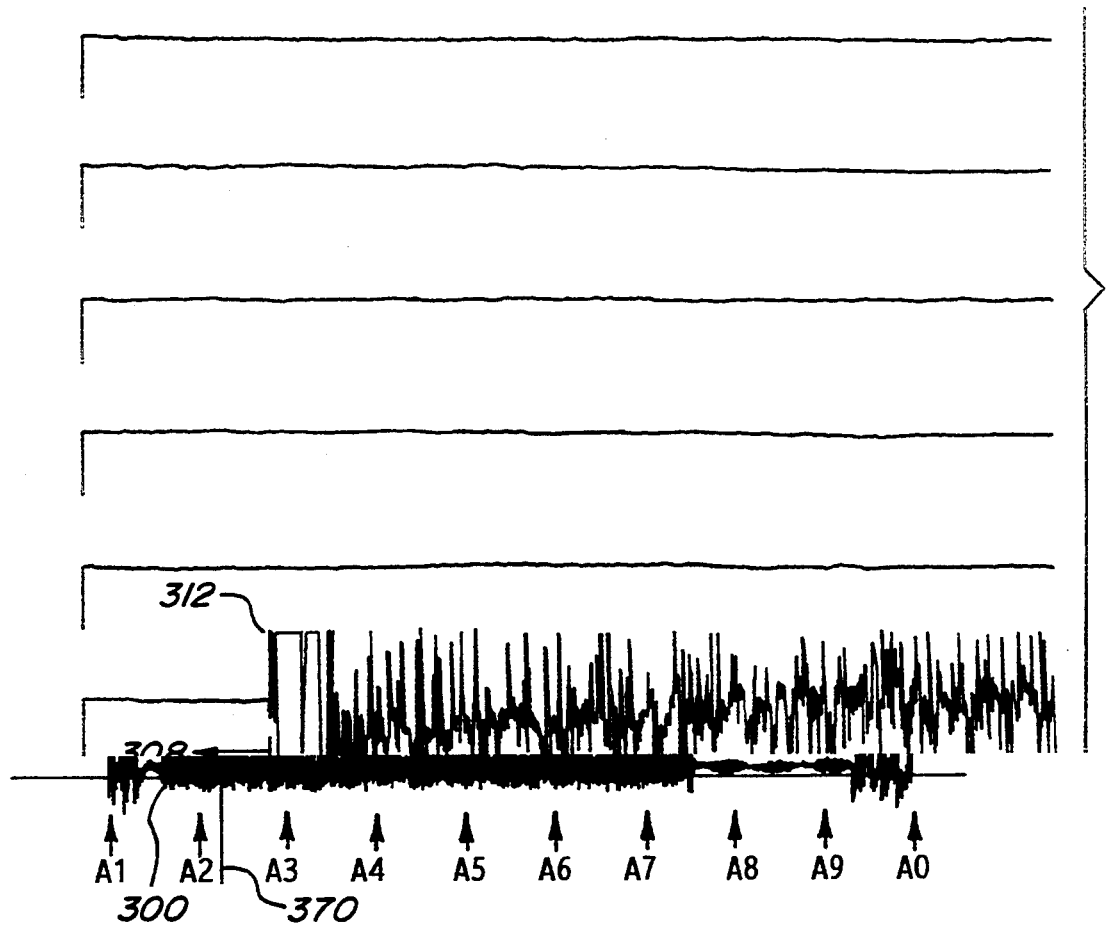
FIG. 11 is a raster scan plot and a plot of a wireless subscriber signal.

A time comb by the least-means-squared method is a fit of uniformly spaced intervals to external signal traits of a wireless subscriber signal to determine phase shift. For example, when the requesting wireless subscriber unit is transmitting the wireless subscriber signal 300, a phase change occurs at line 370 in FIG. 11) between the preamble portion 304 and the text portion 306. One method of performing the time comb is to use a raster scanning device which scans at a fixed rate. Each time a sampled waveform has a zero-crossing, a dot (generally at 372) is plotted at a location of an invisible raster scan at a time of the zero-crossing. If the time between zero-crossings is the same as the raster scanning period, then the dots will continue to be plotted on at in a similar vertical position. When a change in phase occurs, the vertical position also changes (at 374). The time of the phase change can be measured relative to the PFS 328. Time combs can be performed on other signal events, for example see items 13–16. Numerous other time combs can be performed. The above list is meant to be illustrative and not exclusive.

CONFIDENCE LEVEL GENERATION

As described above in conjunction with FIG. 2, the transmit/receive device 104 transmits the combined security code from the security pattern generation device 102 to the modified authorized user verification device 110 which can be located at the access control and switching device 40 location or remote therefrom. The modified authorized user verification device 110 looks for either the identification code from the transmit/receive site 108 (without the security pattern generation device 102) or the combined security code from the transmit/receive sites 104, 106 (with the security pattern generation device 102).

The modified authorized user verification device 110 separates the combined security code into the security pattern and the identification code (or the MIN or the ESN) and transmits each to the confidence level generation device 120. The modified authorized user verification device 110 could also transmit the combined security code to the confidence level generation device 120 for separation.

Alternatively, the security pattern and the identification code (or a portion thereof) can be sent directly from the security pattern generation device 102 to the confidence level generation device 120 via the separate data link 121.

The confidence level generation device 120 compares the security pattern of the requesting wireless subscriber unit to a security pattern stored in the security pattern history storage device 124 under the identification code (the MIN or the ESN) of the requesting wireless subscriber unit. Because the measured features of the same wireless subscriber unit can vary slightly from time to time, the digits in the security pattern representing the characterized features vary slightly. To alleviate this problem, the confidence level generation device 120 generates a confidence factor indicating a likelihood that the wireless subscriber unit generating the security pattern also generated the stored security pattern.

The confidence level generation device 120 outputs the confidence factor to the modified authorized user verification device 110 which decides whether to authorize access to the subscriber service or telephone company 46.

Figure 12:
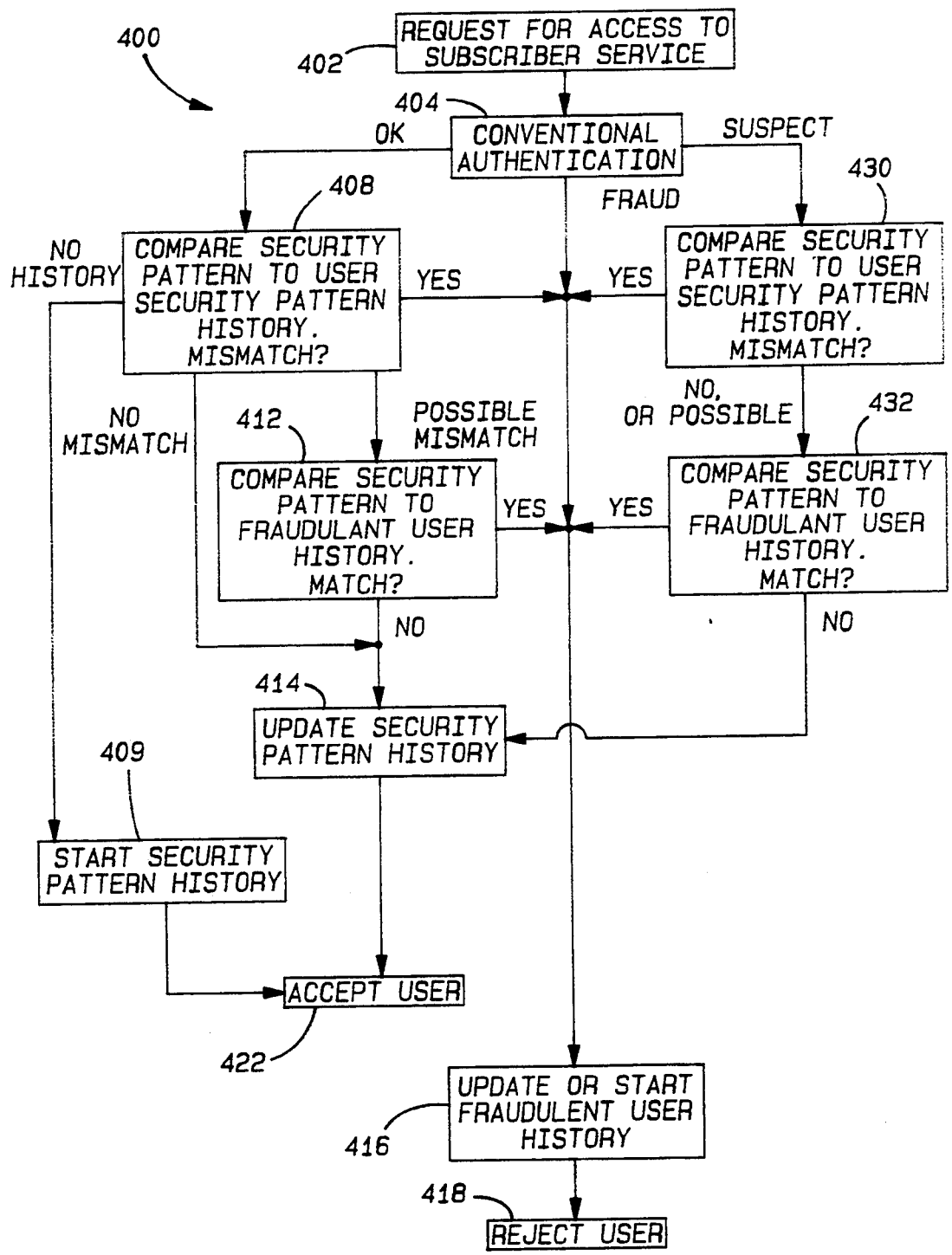
FIG. 12 is functional block diagram of a confidence level generation routine located in a memory of a confidence level generating device.

In FIG. 12, a logic diagram 400 to be executed by the confidence level generating device 120 and the security pattern history storage device 124 is shown. In block 402, a wireless subscriber unit requests access to the subscriber service 46. As described above, the security pattern generating device 102 generates the combined security code for the wireless subscriber unit by characterizing features of the external signal traits of the wireless subscriber unit, by generating a security pattern, and by combining the security pattern with the identification code (the MIN or the ESN). Combining the security pattern and the identification code (the MIN or the ESN) need not be done if a separate data link 121 is utilized.

The modified user authentication device 110 is modified to interact with the confidence level generating device 120. However, the modified authentication device 110 can still perform conventional fraud detection such as profiling and/or other conventional techniques, as depicted in block 404. The modified authentication device 110 (or the confidence level generating device 120) separates the combined security code into the security pattern and the identification code (the MIN or the ESN). Note that the security pattern can be obtained from the combined security code simply by subtracting the identification code (the MIN or the ESN). Alternatively, the separate data link 121 can be used.

If the wireless subscriber unit passes the conventional fraud detection performed by the modified user authentication device 110, then the security pattern is compared in block 408 to a security pattern stored in the security pattern history storage device 124 corresponding to the identification code (the MIN or the ESN) of the requesting wireless subscriber unit.

Each digit or digits of the security pattern correspond to characterizing features of the requesting wireless subscriber unit. Variations in each feature may occur between subsequent characterizations of the same wireless subscriber unit.

The first matching algorithm associated with block 408 determines a confidence level for the security pattern of the requesting wireless subscriber unit. The first matching algorithm could initially determine variations between each feature in the historic security pattern and each feature in the security pattern of the requesting wireless subscriber unit. The matching algorithm could then determine if the entire security pattern is a match, a possible mismatch, or a mismatch from the features tested by generating a confidence level representing probability of mismatch.

For example, a match could include confidence levels between 0% and 33%, a possible mismatch could include confidence levels between 34% and 66%, and a mismatch could include confidence levels between 67% and 100%.

In the example given above, the measured power change time deviation was 61. Assume that this value was previously stored as part of the security pattern in the security pattern history storage device 124 under the identification code (the MIN or ESN) of the requesting wireless subscriber unit. As the power change time deviation of the requesting wireless subscriber unit varies from 61 (the stored value), the confidence level percentage for this feature increases.

For example, if the power change time deviation for the requesting wireless subscriber unit was:

56 (or 66)—the feature confidence level for the power change time deviation could be 60%;

57 (or 65)—the feature confidence level for the power change time deviation could be 45%;

58 (or 64)—the feature confidence level for the power change time deviation could be 30%;

59 (or 63)—the feature confidence level for the power change time deviation could be 20%;

60 (or 62)—the feature confidence level for the power change time deviation could be 10%; or 61—the feature confidence level for the power change time deviation could be 0%.

The matching algorithm similarly determines confidence levels for other digits of the security pattern representing other features of the wireless subscriber unit. Finally the confidence levels for each of the features could be averaged or otherwise weighted to determine the confidence level for the security pattern of the requesting wireless subscriber unit. The weighing given to each feature and the confidence level percentage requirements for match, possible mismatch, and mismatch can be varied as desired. In addition, the confidence level generation device 120 could include an adaptive algorithm which automatically changes or customizes as a wireless subscriber unit develops a security pattern history. The security pattern history can be updated periodically to track changes in the external signal traits as the transmitter ages.

If block 408 determines a possible mismatch between the security pattern of the requesting wireless subscriber unit and the security pattern stored under the identification code (the MIN or the ESN) of the requesting wireless subscriber unit, an additional comparison is performed in block 412 between the security pattern of the requesting wireless subscriber unit and a fraudulent user history which contains characterizing codes of past fraudulent users. The security patterns in the fraudulent user history device are not searched by the identification code (the MIN or ESN) of the requesting user since the wireless subscriber unit may be changing the identification code (the MIN or the ESN) to fraudulently obtain access to the subscriber system 46.

A second matching algorithm performs a weighted comparison between the security pattern of the requesting wireless subscriber unit and the security patterns of multiple suspects stored in the fraudulent user history storage device 125. The fraudulent user history storage device contains data organized, for example, in suspect files. In cellular telephone systems, fraudulent users often change the MIN and ESN for their cellular telephone and obtain free access. When the fraudulent user cannot use the subscriber system after being detected for fraudulent use, the fraudulent user simply changes the MIN and ESN of his cellular telephone and obtains free access again.

However, the fraudulent users cannot change the features measured by the security pattern generating device 102. Therefore, the fraudulent user history device stores the security pattern of the fraudulent user when the fraudulent user is first detected.

If sufficient similarity exists between the features of the security pattern of the requesting wireless subscriber unit and the features of a fraudulent user security pattern (for example suspect #28) as determined in block 412, the fraudulent user history (for suspect #28) can be updated with a number called by the wireless subscriber unit, the identification code (the MIN or the ESN), the confidence level, and the security pattern of the requesting wireless subscriber unit (block 416). The requesting wireless subscriber unit is denied access to the subscriber system (block 418).

If insufficient similarity exists between the security pattern of the requesting wireless subscriber unit and the security pattern in the fraudulent user history device 125, the security pattern history stored under either the MIN or ESN is updated with the security pattern, the confidence level and the number called. The requesting wireless subscriber unit is granted access to the subscriber system (block 422). The confidence level is stored in the security pattern history storage device 124 for later use. For example, when an authorized user receives his phone bill and realizes that he/she did not make a call, the subscriber service operator can look up the confidence level. If the confidence level is high (e.g., indicating a higher probability of mismatch), the call can be removed from the bill.

If conventional authentication in block 404 determines that the requesting wireless subscriber unit is fraudulent, the fraudulent user history device is updated (or started if no prior fraudulent user history is recorded) in block 416 and the user is rejected in block 418.

If conventional authentication in block 404 determines that the requesting wireless subscriber unit is a suspected fraudulent user, then the security code of the requesting wireless subscriber unit is compared in block 430 with the characterizing code stored under the MIN or ESN of the requesting wireless subscriber unit.

The confidence level is generated in block 430 in a manner analogous to the confidence level described above. After comparing each feature in the security pattern of the requesting wireless subscriber unit with the security pattern stored in the security pattern history storage under the identification code (the MIN, or the ESN), possible mismatches and matches are sent to block 432. The security pattern is then compared to suspects in the fraudulent user history device 125 in a manner analogous to block 412.

If a match is not found between the security pattern of the requesting wireless subscriber unit and the fraudulent user history in block 432, the security pattern history device 124 is updated and the wireless subscriber unit allowed access to the subscriber service.

If a match is found between the security pattern of the requesting wireless subscriber unit and the fraudulent user history in block 432 or if the confidence level determined in block 430 indicates a mismatch, the fraudulent user history device 125 is updated (or started) in block 416. The requesting wireless subscriber unit is denied access to the subscriber system in block 418.

Another method of detecting fraudulent wireless subscriber units can be incorporated in the present invention. Use of the subscriber service by a wireless subscriber unit can be monitored by a usage profiling routine device 419 executes a using a microprocessor (analogous to FIG. 3A and can be associated with at least one of the access control and switching device 40 (see FIG. 2), the confidence level generation device 120, the modified authorized user verification device 110, or the subscriber service 46 for various usage parameters. The usage parameter can include the number of times the monitored wireless subscriber unit requests access per day, the number of minutes the monitored wireless subscriber unit uses the subscriber service each day, the number of requests for access per hour, etc. Limits or thresholds for each usage parameter can be stored in memory for each MIN/ESN. Alternatively, a usage history for each MIN/ESN can be stored in the memory. The limits or thresholds can be selected by the subscriber service or the owner of a wireless subscriber unit or alternately programmed limits (e.g. based on past usage) can be used. If the user-selected or the programmed limits or thresholds are exceeded, an excess usage signal can be generated by the profiling routine. The excess usage signal is indicative of fraudulent use, As usage by the monitored wireless subscriber unit varies with time, the programmed limit can be updated, for example, on a monthly basis.

The profiling routine can also monitor additional usage conditions such as wireless subscriber units using multiple MINs with the same ESN, or multiple ESNs with the same MIN. The profiling routine can generate a multiple identity signal indicative of fraudulent use by the monitored wireless subscriber unit.

Upon generating the excess usage signal, or the multiple identity signal, the profiling routine can sever further access to the subscriber service in the manner described above. Alternatively, the profiling routine can be run in situations where the confidence level generation device determines the possible mismatch condition.

As can be appreciated, the present invention can be applied in various other circumstances. For example, a plurality of authorized radio transmitters can be operated at a select frequency. The authorized radio transmitters can be characterized and security patterns recorded for each radio transmitter in a security pattern history storage device. A receiver can intercept transmitter signals from both authorized and unauthorized radio transmitters operating at the select frequency. Security patterns generated by the authorized and unauthorized radio transmitters can be compared to the security patterns in the security pattern history storage device. Confidence levels can be generated for each of the authorized and unauthorized radio transmitters indicating a likelihood that a particular radio transmitter is or is not one of the authorized radio transmitters. As such, clandestine operation of the unauthorized radio transmitter may be detected.

The various advantages of the present invention will become apparent to those skilled in the art after a study of the foregoing specification and following claims.

What is claimed is:

1. A transmitter identification system for identifying a transmitter which produces a transmitter signal in which information is encoded by manipulating a carrier, the transmitter signal including external signal traits resulting from said manipulation that are characteristic of said transmitter, comprising:

receiving means located remote from said transmitter for receiving said transmitter signal;

characterizing means connected to said receiving means for generating a plurality of characterizing signals for said transmitter by measuring features of said external signal traits resulting from said manipulation that are characteristic of said transmitter; and converting means connected to said characterizing means for converting said plurality of characterizing signals into a current security pattern wherein said current security pattern is used to identify said transmitter, wherein said converting means produces said current security pattern by generating feature codes for said plurality of characterizing signals by establishing, separately for each feature, a scale dividing a range of possible values of a characterizing signal for said feature into a predetermined number of divisions, each division being associated with a unique code, said scale divisions including an upper division and a lower division, and wherein a feature code for said feature is produced by assigning said characterizing signal to one of said predetermined number of divisions, as follows:
(a) if said characterizing signal is above a first predetermined value, assigning said characterizing signal a feature code corresponding to said upper division;
(b) if said characterizing signal is below a second predetermined value, assigning said characterizing signal a feature code corresponding to said lower division; and
(c) if said characterizing signal is not above said first predetermined value and not below said second predetermined value, assigning said characterizing signal a feature code, intermediate said features codes which fall between said upper and lower divisions, reflecting the relationship said characterizing signal bears to said first and second predetermined values.

2. The transmitter identification system of claim 1 further comprising:

historic security pattern storing means for storing historic security patterns, each including a plurality of feature codes, for a plurality of transmitters;

first comparing means connected to said converting means and said historic security pattern storing means for comparing each of said feature codes of said current security pattern of said transmitter to corresponding feature codes of at least one of said historic security patterns stored in said historic security pattern storing means, wherein said first comparing means generates feature confidence levels, separately for each feature, related to a difference between each of said feature codes of said current security pattern and said corresponding feature codes of said at least one of said historic security patterns, and wherein said first comparing means generates an overall transmitter confidence level from said feature confidence levels.

3. The transmitter identification system of claim 2 wherein said first comparing means generates one of a mismatch signal, a possible mismatch signal, and a match signal for said transmitter by establishing a scale dividing a range of possible values of said overall transmitter confidence level as follows;
(a) if said overall transmitter confidence level is above a third predetermined value, generating said mismatch signal;
(b) if said overall transmitter confidence level is below a fourth predetermined value, generating said match signal; and
(c) if said overall transmitter confidence level is not above said third predetermined value and not below said fourth predetermined value, generating said possible mismatch signal, wherein said third predetermined value is greater than said fourth predetermined value.

4. Apparatus for identifying a wireless subscriber unit and for granting or denying said wireless subscriber unit access to a subscriber service, said wireless subscriber unit generating a wireless subscriber signal in which data is encoded by manipulating a carrier, said wireless subscriber signal containing external signal traits resulting from said manipulation that are characteristic of said wireless subscriber unit, and said data including an identification code, comprising:

receiving and transmitting means located remote from said wireless subscriber unit for receiving said wireless subscriber signal;

characterizing means connected to said receiving and transmitting means for generating a plurality of characterizing signals for said wireless subscriber unit by measuring features of said external signal traits resulting from said manipulation that are characteristic of said wireless subscriber unit; and converting means connected to said characterizing means for converting said plurality of characterizing signals into a current security pattern wherein said current security pattern and said identification code are used to identify said wireless subscriber unit, wherein said converting means produces said current security pattern by generating feature codes for said plurality of characterizing signals by establishing, separately for each feature, a scale dividing a range of possible values of a characterizing signal for said feature into a predetermined number of divisions, each division being associated with a unique code, said scale divisions including an upper division and a lower division, and wherein a feature code for said feature is produced by assigning said characterizing signal to one of said predetermined number of divisions, as follows:

(a) if said characterizing signal is above a first predetermined value, assigning said characterizing signal a feature code corresponding to said upper division;

(b) if said characterizing signal is below a second predetermined value, assigning said characterizing signal a feature code corresponding to said lower division; and (c) if said characterizing signal is not above said first predetermined value and not below said second predetermined value, assigning said characterizing signal a feature code, intermediate said feature codes which fall between said upper and lower divisions, reflecting the relationship said characterizing signal bears to said first and second predetermined values.

5. The apparatus of claim 4 further comprising:

historic security pattern storing means for storing historic security patterns, each including a plurality of feature codes, for a plurality of wireless subscriber units;

first comparing means connected to said converting means and said historic security pattern storing means for comparing each of said feature codes of said current security pattern of said wireless subscriber unit to corresponding feature codes of at least one of said wireless subscriber units stored in said historic security pattern storing means, wherein said first comparing means generates feature confidence levels, separately for each feature, related to a difference between each of said feature codes of said current security pattern and said corresponding feature codes of said at least one of said historic security patterns, and wherein said first comparing means generates an overall wireless subscriber unit confidence level from said feature confidence levels.

6. The apparatus of claim 5 further including:

access means connected to said first comparing means for granting or denying access to said wireless subscriber unit to said subscriber service based upon said overall wireless subscriber unit confidence level.

7. The apparatus of claim 6 wherein said first comparing means generates one of a mismatch signal, a possible mismatch signal, and a match signal for said wireless subscriber unit by establishing a scale dividing a range of possible values of said overall wireless subscriber unit confidence level as follows:

(a) if said overall wireless subscriber unit confidence level is above a third predetermined value, generating said mismatch signal;

(b) if said overall wireless subscriber unit confidence level is below a fourth predetermined value, generating said match signal; and (c) if said overall wireless subscriber unit confidence level is not above said third predetermined value and not below said fourth predetermined value, generating said possible mismatch signal wherein said third predetermined value is greater than said fourth predetermined value.

8. The apparatus of claim 7 further comprising:

fraudulent user history storing means for storing fraudulent user security patterns, each including a plurality of feature codes, for a plurality of fraudulent wireless subscriber units; and second comparing means connected to said first comparing means for comparing said feature codes of said current security pattern of said wireless subscriber unit to corresponding feature codes of at least one of said fraudulent user security patterns when said first comparing means generates the possible mismatch signal.

9. The apparatus of claim 8 wherein said second comparing means generates fraud feature confidence levels related to a difference between each of said feature codes of said current security pattern and said corresponding feature codes of said at least one fraudulent user security pattern, and produces an overall fraudulent confidence level from said fraudulent feature confidence levels, wherein said second comparing means generates one of a fraud match signal or a fraud mismatch signal as follows:

(a) if said overall fraud confidence level is above a fifth predetermined value, generating said fraud match signal; and (b) if said overall fraud confidence level is below said fifth predetermined value, generating said fraud mismatch signal.

10. The apparatus of claim 9 wherein said access means grants access to said wireless subscriber unit if said first comparing means generates the match signal, or if said first comparing means generates the possible mismatch signal and said second comparing means generates the fraud mismatch signal.

11. The apparatus of claim 10 wherein said access means denies access to said wireless subscriber unit if said first comparing means generates the mismatch signal, or if the first comparing means generates the possible mismatch signal and said second comparing means generates the fraud match signal.

12. The apparatus of claim 11 wherein said fraudulent user history storing means is updated with said current security pattern of said wireless subscriber unit if said second comparing means generates the fraud match signal.

13. The apparatus of claim 10 wherein said said historic security pattern stored in said historic security pattern storing means corresponding to said identification code is updated with said current security pattern of said wireless subscriber unit if said second comparing means generates the fraud mismatch signal.

14. The apparatus of claim 4 wherein said converting means compares said plurality of characterizing signals to a plurality of standard signals and generates a plurality of multibit signals representing deviation of each of said characterizing signals from each of said standard signals.

15. The apparatus of claim 14 wherein said converting means combines said plurality of multibit signals into said current security pattern.

16. The apparatus of claim 14 wherein said converting means combines said plurality of multibit signals and said identification code into said current security pattern.

17. The apparatus of claim 4 wherein said characterizing means generates at least one of said characterizing signals by timing a feature in said wireless subscriber signal.

18. The apparatus of claim 17 wherein said converting means compares said at least one of said characterizing signals representing said timing of said feature to a standard timing signal and generates a first multibit signal representing deviation of said characterizing signal from said standard timing signal.

19. The apparatus of claim 4 wherein said characterizing means generates at least one of said characterizing signals by performing a time comb on a portion of said wireless subscriber signal.

20. The apparatus of claim 4 wherein said characterizing means generates at least one of said characterizing signals by generating a frequency histogram on a portion of said wireless subscriber signal to determine RF shift of said wireless subscriber signal.

21. The apparatus of claim 4 wherein said characterizing means generates at least one of said characterizing signals by fitting a line by a least-means-squared method to a mark portion of said wireless subscriber signal.

22. The apparatus of claim 4 wherein said characterizing means generates at least one of said characterizing signals by fitting a line by a least-means-squared method to a space portion of said wireless subscriber signal.

23. Apparatus for identifying a wireless subscriber unit and for granting or denying said wireless subscriber unit access to a subscriber service, said wireless subscriber unit generating a wireless subscriber signal in which data is encoded by manipulating a carrier, the wireless subscriber signal containing external signal traits resulting from said manipulation that are characteristic of said wireless subscriber unit, and said data including an identification code, comprising:
  receiving and transmitting means located remote from said wireless subscriber unit for receiving said wireless subscriber signal;
  characterizing means connected to said receiving and transmitting means for generating a plurality of characterizing signals for said wireless subscriber unit by measuring features of said external signal traits resulting from said manipulation that are characteristic of said wireless subscriber unit;
  converting means connected to said characterizing means for converting said plurality of characterizing signals into a current security pattern, wherein said current security pattern and said identification code are used to identify said wireless subscriber unit,
  wherein said converting means produces said current security pattern by generating feature codes for said plurality of characterizing signals by establishing, separately for each feature, a scale dividing a range of possible values of a characterizing signal for said feature into a predetermined number of divisions, each division being associated with a unique code, said scale divisions including an upper division and a lower division, and
  wherein a feature code for said feature is produced by assigning said characterizing signal to one of said predetermined number of divisions, as follows:
    (a) if said characterizing signal is above a first predetermined value, assigning said characterizing signal a feature code corresponding to said upper division;
    (b) if said characterizing signal is below a second predetermined value, assigning said characterizing signal a feature code corresponding to said lower division; and
    (c) if said characterizing signal is not above said first predetermined value and not below said second predetermined value, assigning said characterizing signal a feature code, intermediate said feature codes which fall between said upper and lower divisions, reflecting the relationship said characterizing signal bears to said first and second predetermined values;
  historic security pattern storing means for storing historic security patterns, each including a plurality of feature codes, for a plurality of wireless subscriber units;
  first comparing means connected to said converting means and said historic security pattern storing means for comparing each of said feature codes of said current security pattern of said wireless subscriber unit to corresponding feature codes of at least one of said wireless subscriber units stored in said historic security pattern storing means corresponding to said identification code of said wireless subscriber unit,
  wherein said first comparing means generates feature confidence levels, separately for each feature, related to a difference between each of said feature codes of said current security pattern and said corresponding feature codes of said at least one of said historic security patterns, and
  wherein said first comparing means generates an overall wireless subscriber unit confidence level from said feature confidence levels;
  access means connected to said first comparing means for granting or denying access to said wireless subscriber unit to said subscriber service based upon said overall wireless subscriber unit confidence level.

24. A method for identifying a wireless subscriber unit and for granting or denying said wireless subscriber unit access to a subscriber service, said wireless subscriber unit generating a wireless subscriber signal in which data is encoded by manipulating a carrier, the wireless subscriber signal containing external signal traits resulting from said manipulation that are characteristic of said wireless subscriber unit, and said data including an identification code, comprising the steps of:

provinding receiving and transmitting means located remote from said wireless subscriber unit for receiving said wireless subscriber signal;

characterizing said wireless subscriber unit by generating a plurality of characterizing signals for said wireless subscriber unit by measuring a plurality of features of said external signal traits resulting from said manipulation that are characteristic of said wireless subscriber unit;

converting said plurality of characterizing signals to a security pattern by generating feature codes for said plurality of characterizing signals by establishing, separately for each feature, a scale dividing a range of possible values of a characterizing signal for said feature into a predetermined number of divisions, each division being associated with a unique code, said scale divisions including an upper division and a lower division, and wherein a feature code for said feature is produced by assigning said characterizing signal to one of said predetermined number of divisions, as follows:

(a) if said characterizing signal is above a first predetermined value, assigning said characterizing signal a feature code corresponding to said upper division;

(b) if said characterizing signal is below a second predetermined value, assigning said characterizing signal a feature code corresponding to said lower division; and (c) if said characterizing signal is not above said first predetermined value and not below said second predetermined value, assigning said characterizing signal a feature code, intermediate said feature codes which fall between said upper and lower divisions, reflecting the relationship said characterizing signal bears to said first and second predetermined values;

storing said security pattern and said identification code in an ordered relationship;

subsequently utilizing said security pattern to grant or deny access to said subscriber service to a requesting wireless subscriber unit with same identification code.

25. The method of claim 21 further comprising the steps of:

generating a current security pattern, including a plurality of feature codes, for said requesting wireless subscriber unit;

comparing said feature codes of said requesting wireless subscriber unit with corresponding feature codes of said security pattern stored in said ordered relationship with said identification code;

generating feature confidence levels, separately for each feature, related to a difference between each of said feature codes of said requesting wireless subscriber unit and said corresponding feature codes of said security pattern stored in said ordered relationship with said identification code;

generating an overall wireless subscriber unit confidence level from said feature confidence levels.

26. The method of claim 25 further comprising the steps of:

granting or denying access to said wireless subscriber unit to said subscriber service based upon said overall wireless subscriber unit confidence level.

27. The method of claim 24 further comprising the step of:

monitoring at least one usage parameter indicative of fraudulent use.

28. The method of claim 27 wherein said usage parameter includes at least one of a number of times a wireless subscriber unit requests access to said subscriber service in a first period, and a length of time said wireless unit uses said subscriber service in second period.

29. A transmitter identification system for identifying a transmitter which produces a transmitter signal in which information is encoded by manipulating a carrier, the transmitter signal including external signal traits resulting from transmitter timing idiosyncrasies that are characteristic of said transmitter, comprising:

receiving means located remote from said transmitter for receiving said transmitter signal;

characterizing means connected to said receiving means for generating a plurality of characterizing signals for said transmitter by measuring features of said external signal traits resulting from said transmitter timing idiosyncrasies that are characteristic of said transmitter; and converting means connected to said characterizing means for converting said plurality of characterizing signals into a current security pattern wherein said current security pattern is used to identify said transmitter, wherein said converting means produces said current security pattern by generating feature codes for said plurality of characterizing signals by establishing, separately for each feature, a scale dividing a range of possible values of a characterizing signal for said feature into a predetermined number of divisions, each division being associated with a unique code, said scale divisions including an upper division and a lower division, and wherein a feature code for said feature is produced by assigning said characterizing signal to one of said predetermined number of divisions, as follows:

(a) if said characterizing signal is above a first predetermined value, assigning said characterizing signal a feature code corresponding to said upper division;

(b) if said characterizing signal is below a second predetermined value, assigning said characterizing signal a feature code corresponding to said lower division; and (c) if said characterizing signal is not above said first predetermined value and not below said second predetermined value, assigning said characterizing signal a feature code, intermediate said feature codes which fall between said upper and lower divisions, reflecting the relationship said characterizing signal bears to said first and second predetermined values.

30. The transmitter identification system of claim 29 further comprising:

historic security pattern storing means for storing historic security patterns, each including a plurality of feature codes, for a plurality of transmitters;

first comparing means connected to said converting means and said historic security pattern storing means for comparing each of said feature codes of said current security pattern of said transmitter to corresponding feature codes of at least one of said historic security patterns stored in said historic security pattern storing means, wherein said first comparing means generates feature confidence levels, separately for each feature, related to a difference between each of said feature codes of said current security pattern and said corresponding feature codes of said at least one of said historic security patterns, and wherein said first comparing means generates an overall transmitter confidence level from said feature confidence levels.

31. The transmitter identification system of claim 30 wherein said first comparing means generates one of a mismatch signal, a possible mismatch signal, and a match signal for said transmitter by establishing a scale dividing a range of possible values of said overall transmitter confidence level as follows:
 (a) if said overall transmitter confidence level is above a third predetermined value, generating said mismatch signal;
 (b) if said overall transmitter confidence level is below a fourth predetermined value, generating said match signal; and
 (c) if said overall transmitter confidence level is not above said third predetermined value and not below said fourth predetermined value, generating said possible mismatch signal wherein said third predetermined value is greater than said fourth predetermined value.

32. Apparatus for identifying a wireless subscriber unit and for granting or denying said wireless subscriber unit access to a subscriber service, said wireless subscriber unit generating a wireless subscriber signal in which data is encoded by manipulating a carrier, said wireless subscriber signal containing external signal traits resulting from wireless subscribing unit timing idiosyncrasies that are characteristic of said wireless subscriber unit, and said data including an identification code, comprising:
 receiving and transmitting means located remote from said wireless subscriber unit for receiving said wireless subscriber signal;
 characterizing means connected to said receiving and transmitting means for generating a plurality of characterizing signals for said wireless subscriber unit by measuring features of said external signal traits resulting from said wireless subscriber unit timing idiosyncrasies that are characteristic of said wireless subscriber unit; and
 converting means connected to said characterizing means for converting said plurality of characterizing signals into a current security pattern wherein said current security pattern and said identification code are used to identify said wireless subscriber unit,
 wherein said converting means produces said current security pattern by generating feature codes for said plurality of characterizing signals by establishing, separately for each feature, a scale dividing a range of possible values of a characterizing signal for said feature into a predetermined number of divisions, each division being associated with a unique code, said scale divisions including an upper division and a lower division, and
 wherein said feature code for said feature is produced by assigning said characterizing signal to one of said predetermined number of divisions, as follows:
  (a) if a characterizing signal is above a first predetermined value, assigning said characterizing signal a feature code corresponding to said upper division;
  (b) if said characterizing signal is below a second predetermined value, assigning said characterizing signal a feature code corresponding to said lower division; and
  (c) if said characterizing signal is not above said first predetermined value and not below said second predetermined value, assigning said characterizing signal a feature code, intermediate said feature codes which fall between said upper and lower divisions, reflecting the relationship said characterizing signal bears to said first and second predetermined values.

33. The apparatus of claim 32 further comprising:
historic security pattern storing means for storing historic security patterns, each including a plurality of feature codes, for a plurality of wireless subscriber units;
first comparing means connected to said converting means and said historic security pattern storing means for comparing each of said feature codes of said current security pattern of said wireless subscriber unit to corresponding feature codes of at least one of said wireless subscriber units stored in said historic security pattern storing means,
wherein said first comparing means generates feature confidence levels, separately for each feature, related to a difference between each of said feature codes of said current security pattern and said corresponding feature codes of said at least one of said historic security patterns, and
wherein said first comparing means generates an overall wireless subscriber unit confidence level from said feature confidence levels.

34. The apparatus of claim 33 further including:
access means connected to said first comparing means for granting or denying access to said wireless subscriber unit to said subscriber service based upon said overall wireless subscriber unit confidence level.

35. The apparatus of claim 34 wherein said first comparing means generates one of a mismatch signal, a possible mismatch signal, and a match signal for said wireless subscriber unit by establishing a scale dividing a range of possible values of said overall wireless subscriber unit confidence level as follows:
 (a) if said overall wireless subscriber unit confidence level is above a third predetermined value, generating said mismatch signal;
 (b) if said overall wireless subscriber unit confidence level is below a fourth predetermined value, generating said match signal; and
 (c) if said overall wireless subscriber unit confidence level is not above said third predetermined value and not below said fourth predetermined value, generating said possible mismatch signal, wherein said third predetermined value is greater than said fourth predetermined value.

36. The apparatus of claim 35 further comprising:
fraudulent user history storing means for storing fraudulent user security patterns, each including a plurality of feature codes, for a plurality of fraudulent wireless subscriber units; and second comparing means connected to said first comparing means for comparing said feature codes of said current security pattern of said wireless subscriber unit to corresponding feature codes of at least one of said fraudulent user security patterns when said first comparing means generates the possible mismatch signal.

37. The apparatus of claim 36 wherein said second comparing means generates fraud feature confidence levels related to a difference between each of said feature codes of said current security pattern and said corresponding feature codes of said at least one fraudulent user security pattern, and produces a fraud confidence level from said fraudulent feature confidence levels, wherein said second comparing means generates one of a fraud match signal or a fraud mismatch signal as follows:

(a) if said fraud confidence level is above a fifth predetermined value, generating said fraud match signal; and (b) if said fraud confidence level is below said fifth predetermined value, generating said fraud mismatch signal.

38. The apparatus of claim 37 wherein said access means grants access to said wireless subscriber unit if said first comparing means generates the match signal, or if said first comparing means generates the possible mismatch signal and said second comparing means generates the fraud mismatch signal.

39. The apparatus of claim 38 wherein said security pattern stored in said historic security pattern storing means for said identification code is updated with said current security pattern of said wireless subscriber unit if said second comparing means generates the fraud match signal.

40. The apparatus of claim 37 wherein said access means denies access to said wireless subscriber unit if said first comparing means generates the mismatch signal, or if the first comparing means generates the possible mismatch signal and said second comparing means generates the fraud match signal.

41. The apparatus of claim 40 wherein said fraudulent user history storing means is updated with said current security pattern of said wireless subscriber unit if said second comparing means generates the fraud match signal.

42. The apparatus of claim 32 wherein said characterizing means generates at least one of said characterizing signals by timing a feature in said wireless subscriber signal.

43. The apparatus of claim 42 wherein said converting means compares said at least one of said characterizing signals representing said timing of said feature to a standard timing signal and generates a first multibit signal representing deviation of said characterizing signal from said standard timing signal.

44. Apparatus for identifying a wireless subscriber unit and for granting or denying said wireless subscriber unit access to a subscriber service, said wireless subscriber unit generating a wireless subscriber signal in which data is encoded by manipulating a carrier, the wireless subscriber signal containing external signal traits resulting from wireless subscriber unit timing idiosyncrasies that are characteristic of said wireless subscriber unit and said data including an identification code, comprising:

receiving and transmitting means located remote from said wireless subscriber unit for receiving said wireless subscriber signal;

characterizing means connected to said receiving and transmitting means for generating a plurality of characterizing signals for said wireless subscriber unit by measuring features of said external signal traits resulting from said wireless subscriber unit timing idiosyncrasies that are characteristic of said wireless subscriber unit;

converting means connected to said characterizing means for converting said plurality of characterizing signals into a current security pattern, wherein said current security pattern and said identification code are used to identify said wireless subscriber unit, wherein said converting means produces said current security pattern by generating feature codes for said plurality of characterizing signals by establishing, separately for each feature, a scale dividing a range of possible values of a characterizing signal for said feature into a predetermined number of divisions, each division being associated with a unique code, said scale divisions including an upper division and a lower division, and wherein a feature code for said feature is produced by assigning said characterizing signal to one of said predetermined number of divisions, as follows:

(a) if said characterizing signal is above a first predetermined value, assigning said characterizing signal a feature code corresponding to said upper division;

(b) if said characterizing signal is below a second predetermined value, assigning said characterizing signal a feature code corresponding to said lower division; and (c) if said characterizing signal is not above said first predetermined value and not below said second predetermined value, assigning said characterizing signal a feature code, intermediate said feature codes which fall between said upper and lower divisions, reflecting the relationship said characterizing signal bears to said first and second predetermined values;

historic security pattern storing means for storing historic security patterns, each including a plurality of feature codes, for a plurality of wireless subscriber units;

first comparing means connected to said converting means and said historic security pattern storing means for comparing each of said feature codes of said current security pattern to corresponding feature codes of at least one of said wireless subscriber units stored in said historic security pattern storing means corresponding to said identification code of said wireless subscriber unit, wherein said first comparing means generates feature confidence levels, separately for each feature, related to a difference between each of said feature codes of said current security pattern and said corresponding feature codes of said at least one of said historic security patterns, and wherein said first comparing means generates an overall wireless subscriber unit confidence level from said feature confidence level;

access means connected to said first comparing means for granting or denying access to said wireless subscriber unit to said subscriber service based upon said overall wireless subscriber unit confidence level.

* * * * *